is a continuation-in-part of Ser. No. 206,382, Mar. 1, 1994, abandoned.

United States Patent [19]
Sarangdhar et al.

[11] Patent Number: 5,796,977
[45] Date of Patent: Aug. 18, 1998

[54] HIGHLY PIPELINED BUS ARCHITECTURE

[75] Inventors: Nitin V. Sarangdhar; Gurbir Singh, both of Portland; Konrad Lai, Aloha; Stephen S. Pawlowski, Beaverton; Peter D. MacWilliams, Aloha; Michael W. Rhodehamel, Beaverton, all of Oreg.

[73] Assignee: Intel Corporation, Santa Clara, Calif.

[21] Appl. No.: 688,238

[22] Filed: Jul. 29, 1996

Related U.S. Application Data

[63] Continuation of Ser. No. 390,969, Feb. 21, 1995, abandoned, which is a continuation-in-part of Ser. No. 206,382, Mar. 1, 1994, abandoned.

[51] Int. Cl.⁶ .................... G06F 12/00; G06F 13/00
[52] U.S. Cl. ................. 395/406; 395/561; 395/468; 395/473
[58] Field of Search ....................... 395/473, 467, 395/468

[56] References Cited

U.S. PATENT DOCUMENTS

| | | | |
|---|---|---|---|
| 5,311,458 | 5/1994 | Haines et al. | 364/736 |
| 5,327,538 | 7/1994 | Hamaguchi et al. | 395/325 |
| 5,327,570 | 7/1994 | Foster et al. | 395/800 |
| 5,339,399 | 8/1994 | Lee et al. | 395/425 |
| 5,345,569 | 9/1994 | Tran | 395/375 |
| 5,353,415 | 10/1994 | Wolford et al. | 395/325 |
| 5,353,416 | 10/1994 | Olson | 395/325 |
| 5,367,660 | 11/1994 | Gat et al. | 395/425 |
| 5,420,991 | 5/1995 | Konigsfeld et al. | 395/375 |

OTHER PUBLICATIONS

"The Metaflow Architecture", Val Popescu, Merle Schults, John Spracklen, Gary Gibson, Bruce Lightner and David Isaman, IEEE Micro, Jun. 1991 (pp. 10–13, 63–73).

*Primary Examiner*—Ayaz R. Sheikh
*Assistant Examiner*—Jigar Pancholi
*Attorney, Agent, or Firm*—Blakely, Sokoloff, Taylor & Zafman

[57] ABSTRACT

A computer system incorporating a pipelined bus that maintains data coherency, supports long latency transactions and provides processor order is described. The computer system includes bus agents having in-order-queues that track multiple outstanding transactions across a system bus and that perform snoops in response to transaction requests providing snoop results and modified data within one transaction. Additionally, the system supports long latency transactions by providing deferred identifiers during transaction requests that are used to restart deferred transactions.

16 Claims, 15 Drawing Sheets

HIGHLY PIPELINED BUS ARCHITECTURE

CROSS-REFERENCE TO RELATED APPLICATIONS

This is a continuation of a U.S. patent application (Application Ser. No. 08/390,969) filed Feb. 21, 1995, now abandoned, which is a continuation-in-part of application Ser. No. 08/206,382, filed Mar. 1, 1994, now abandoned.

BACKGROUND OF THE INVENTION

1. Field of the Invention

The described invention relates generally to the field of computer systems. More particularly, it relates to a deeply pipelined bus architecture for use in a multiprocessor computer system.

2. Related Art

It is common knowledge that a computer system comprises a number of components including, but not limited to microprocessors, memory units and input/output (I/O) devices (hereinafter generically referred to as "agents"). These agents normally exchange information through a system bus. Since overall performance of the computer system is directly related to this rate of exchange (i.e., speed, efficiency, etc.) of the system bus, many attempts have been made to improve its efficiency.

One conventional method to improve the performance of the system bus is pipelining. Pipelining is the process of allowing new bus transactions to begin before previous bus transactions have concluded. This process has proven effective because it allows time delays between requests to read or write data and the actual read or write transactions, to be used by the other transactions. These times delays are created by different response capabilities of the agents. Thus, in pipelining, the system bus is used more efficiently leading to better overall system performance.

Various other developments in the design of computer systems, although improving its overall performance, complicate the process by which data is transferred over the system bus. Thus, pipelining is more difficult to support.

One example of such a development is "multiprocessing." Multiprocessing is the use of multiple microprocessors in a single computer system, each microprocessor performing tasks simultaneously with the others. Theoretically, a computer system with "n" microprocessors can perform "n" times as many tasks and therefore can be "n" times faster than a computer with a single processor.

A condition for multiprocessing is that the most recent version of data always be locatable and that each processor be assured that it will be provided with a version of the most recent data when it is needed to perform a task. This is called "data coherency." Providing data coherency, however, increases the difficulty in pipelining bus transactions because when multiple transactions are outstanding, it is often difficult to determine where the most recent version of data can be located. The usual response to this dilemma is to abandon execution of the bus transaction until the agent caching the data can write it to memory. However, this response substantially eliminates the benefits that were derived from pipelining in the first place.

Another method used separately to improve performance of the system bus is "processor ordering" support in a multiprocessor system. Processor ordering implies that transactions generated by any processor in the computer system are observed in the same order by all agents in that computer system. In a pipelined environment where transactions may be aborted, a set of protocols must be in place to ensure processor ordering.

Another method for improving performance of a system bus is the use of deferred transactions. A deferred transaction allows transactions that cannot be completed at the time of request to be deferred by a component on the bus that is responsible for providing the data (i.e., "responding agent"). When the data becomes available, the responding agent initiates a new transaction directed at a component that requested the data (i.e., "requesting agent"). This prevents the bus from being filled with repeated failed requests from the requesting agent for data that is not yet available.

The use of deferred transactions to increase the efficiency of a system bus may conflict with the use of multiple microprocessors in a computer system. This is because the location of the most recent version of data while the transaction is being deferred may be in transition. Once again, the use of multiple microprocessors in a computer system conflicts with the more efficient use of the bus system.

Because of the various conflicts between these methods used separately to increase the efficiency of a computer bus and the conditions necessary for a multiprocessor system, the overall efficiency of a multiprocessor computer system has never realized its maximum potential. If, however, a system bus could be developed that provides a highly pipelined architecture while supporting multiple microprocessors with MESI cache coherency, processor ordering and deferred transaction response support, a computer system performing more closely to the maximum potential could be achieved.

BRIEF SUMMARY OF THE INVENTION

The described invention is a method and system for exchanging messages and data between various components employed within a single or preferably multi-processing computer system.

In accordance with one aspect of the invention a system bus is provided within a computer system. The system bus includes numerous signals lines grouped into sets of data lines, address lines, status lines, and error lines. Transactions are divided into six phases that include arbitration, request, error, snoop, response, and data. The number of clock cycles that take place between each phase, and the signal lines that carry data during each phase, are oriented in such a way that multiple transactions can be pipelined through the bus system. Additionally, different phases of different transactions may be placed on the bus simultaneously provided they do not require the same signal lines to perform their function.

In a preferred embodiment of the invention, data coherency is maintained through the use of an Implicit Writeback transaction. Devices which use the bus for data transfer ("agents") and which have local memory ("cache") are required to perform a cache snoop after the request phase of a bus transaction, and provide the results of that snoop during the Snoop Phase. If the latest copy of the requested data is detected by a caching agent during the snoop, that agent must provide the data to the requesting agent without disrupting the pipeline. Additionally, ownership of that data is managed throughout the transaction so other transactions requesting the same data will be guaranteed to receive the most recent version.

Long latency transactions are also supported in the preferred embodiment of the invention. When requested, transactions cannot be completed in a predetermined time period, the agent providing the data ("responding agent") may defer the transaction without disrupting the pipeline. When the data later becomes available, the responding agent may initiate a new transaction and provide the completion response and any data to the original requesting agent. To preserve processor ordering in the case of a defer transaction, back-to-back write transactions from the same agent are prohibited until the results of the snoop performed for the first transaction are available.

BRIEF DESCRIPTION OF THE DRAWINGS

The features and advantages of the present invention will become apparent from the following detailed description of the present invention in which.

DETAILED DESCRIPTION OF THE INVENTION

A method and apparatus are described for efficient operation of a pipelined system bus to maintain data coherency and to provide processor ordering support without disruption of its pipelining. In the following detailed description, numerous specific details and illustrative timing diagrams of various bus transactions are set forth to fully describe the present invention. It is apparent, however, to one skilled in the art, that the present invention may be practiced without incorporating these specific details, but may find wide application for use in any computer system.

In the detailed description, a number of terms are frequently used to describe certain characteristics of components within the computer system. These terms are not mutually exclusive. A "requesting agent" is the agent initiating a request typically to read or write data. A "responding agent" is an agent responding to the request by providing the data. A "caching agent" is an agent having cache capabilities such as a microprocessor. A "snooping agent" is an agent that snoops its internal memory for data requests by a bus transaction, normally being one of the caching agents. More general terms include a "receiving" agent, which is an agent receiving data, normally from a write transaction and a "data transfer" agent being a requesting agent, responding agent or snooping agent transferring data along the system bus.

Figure 1:
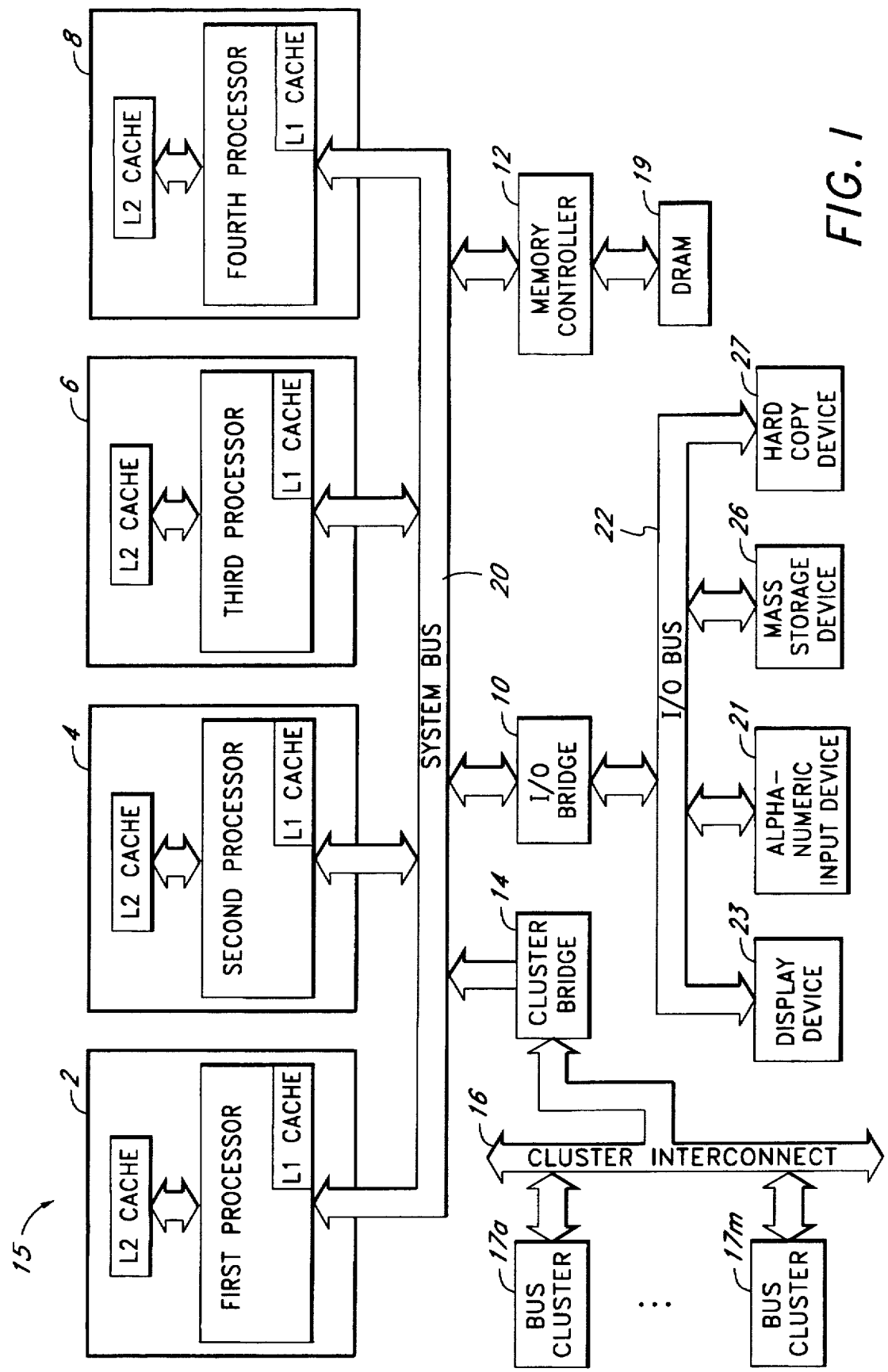
FIG. 1 is a block diagram of a bus cluster comprising a plurality of agents which initiate and control pipelining of transactions along a system bus.

FIG. 1 is a block diagram of a bus cluster 15 including four microprocessors 2, 4, 6, and 8, along with an I/O bridge 10 and a memory controller 12 coupled to system bus 20. Each of these above-identified "agents" is capable of sending and/or receiving data or messages over the bus. In this embodiment, the I/O bridge 10 provides a communication path between the system bus 20 and a number of peripherals coupled to an I/O bus 22 including, but not limited to, a display device 23, alphanumeric input device 21, mass storage device 26, and hard copy device 27. In this same embodiment, the memory controller 12 is coupled to a set of dynamic random access memories 19 (DRAM), however other memory devices are foreseeable. Moreover, a cluster bridge 14 is coupled to the system bus 20 and a cluster interconnect 16 which allows the bus cluster to communicate with other bus clusters 17a-7m ("m" being arbitrary).

The signal lines and logic of the system bus 20 is implemented using Gunning Transceiver Logic (GTL) from Xerox® Corporation which provides low power consumption and electromagnetic interference (EMI). The use of this technology allows up to eight agents to be coupled to system bus 20 while still maintaining a bus clock speed of up to 100 MHz. Various embodiments incorporate various clock speeds including 33.3 MHz, 44.4 MHz, and 66.7 MHz although other clock speeds may also be used. These clock speeds allow the invention to be incorporated into computer systems having various hardware capabilities.

Figure 2:
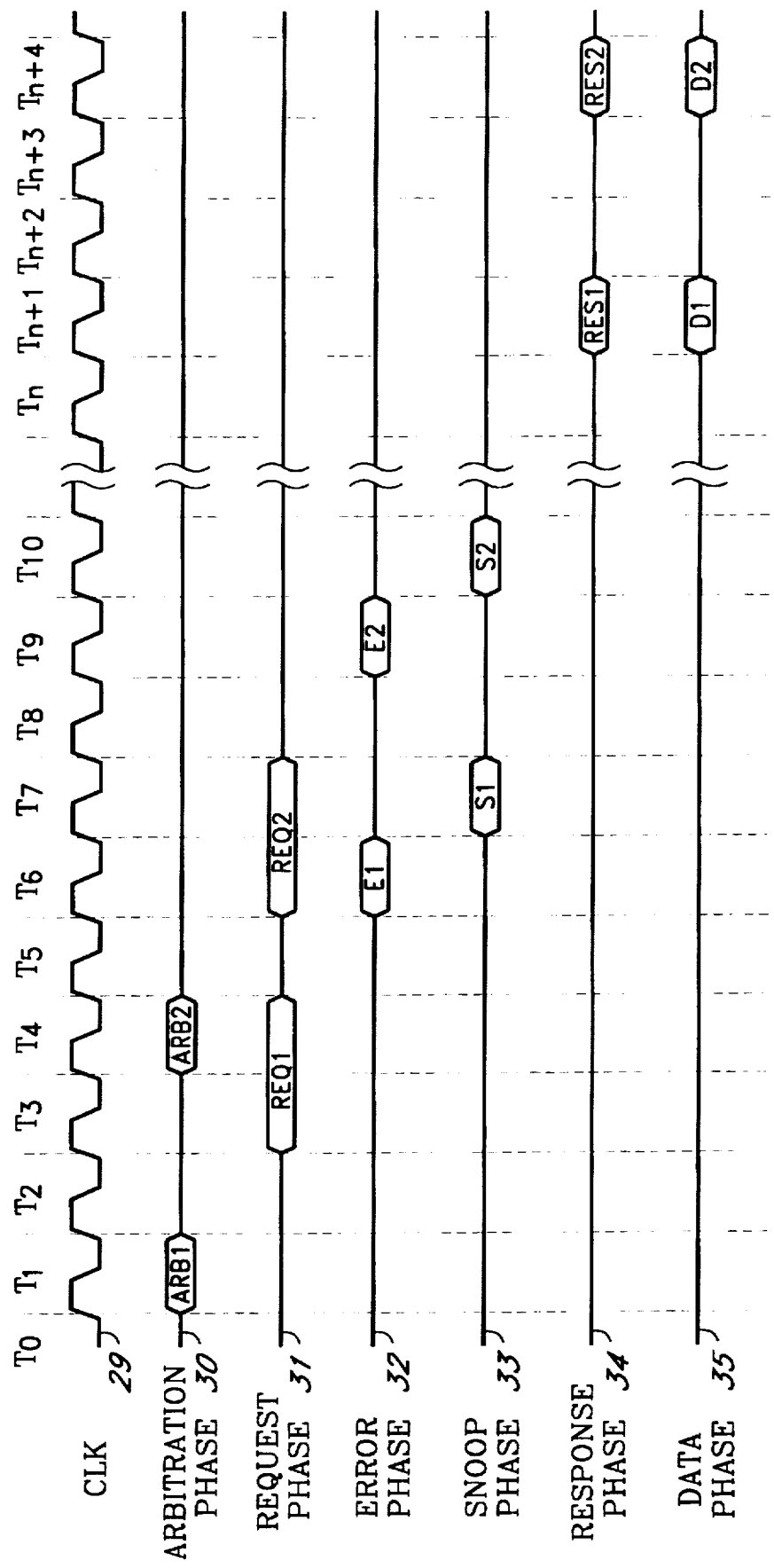
FIG. 2 is a general timing phase diagram illustrating those phases undertaken by two pipelined transactions supported by the system bus of FIG. 1.

FIG. 2 is a timing diagram illustrating the phases of two bus transactions supported by the system bus of FIG. 1. Each bus transaction includes six phases; appropriately separated by a selected number of clock cycles (labeled "T1", "T2", etc.) of a system clock "CLK" 29; namely, Arbitration, Request, Error, Snoop, Data, and Response. It is contemplated that these phases may be arranged with various timing components as needed.

During the Arbitration Phase, ownership of the bus during the remaining phases is determined. During the Request Phase, the agent "owning" the system bus of the Arbitration Phase provides information necessary for other agents to begin the transaction desired by the requesting agent. This information includes an address of the data to be manipulated, if any, as well as a code indicating the operation to be performed. Any parity errors detected during the Request Phase will cause an error signal to be asserted during the Error Phase. During the Snoop Phase, the results of snoops performed by any caching agents on the system bus are asserted. During the Data Phase, any requested data transfer is accomplished. The transaction is removed from the bus pipeline, and the results of that transaction are asserted during the Response Phase. Various signals are used during each phase to supply information as discussed below.

The types of transactions supported in the preferred embodiment include, but are not limited to, (i) cache line reads and writes, where a cache line consists of thirty-two bytes or four 8 byte "chunks"; (ii) eight and sixteen byte reads and writes (referred to as partial cache line reads and writes); (iii) cache lines read-and-invalidates; and (iv) cache line invalidates. An invalidate transaction causes other caching agents to place their cache line, storing requested data, in an "Invalid" state (See below for explanation of invalid) so that the requesting agent can obtain exclusive ownership of the requested data within its own cache. While these are the transactions supported in one embodiment of the invention, other implementation could utilize a different set of transactions while still incorporating the invention.

In performing bus arbitration, each agent of FIG. 1 relies on four groups of arbitration signals; namely, BR[3:0]#, BPRI#, BNR# and LOCK# signals. The BR[3:0]# signals are bus request signals used for receiving and sending bus ownership requests. The BPRI# signal is a priority request signal used to indicate that an agent is receiving bus ownership requests from a high priority bus agent. Furthermore, a LOCK# signal is a bus-locked transaction signal used by an agent to signal all other agents that bus ownership is currently locked, i.e., bus ownership cannot change while any agent is asserting the LOCK# signal. The BNR# signal is asserted by any agent to temporarily suspend the assertion of new bus transactions.

In the Request Phase, the signals used to create a new bus transaction request are ADS#, REQ[4:0]#, A[35:3]#, AP[1:0]# and RP#. An assertion of ADS# indicates that the remaining signals in the Request Phase are valid. REQ[4:0]# indicate the type of request made during a bus transaction. The A[35:3]# indicate the address, if any, targeted by the requested bus transaction. The RP# and AP[1:0]# provide parity protection on signals REQ[4:0]# and A[35:3]#, respectively. In this application, signals ADS#, REQ[4:0]#, A[35:3]#, AP[1:0]# and RP# are valid for two consecutive clock cycles beginning from when ADS# is asserted. For ease of reference, a signal asserted in the first clock cycle of the request phase will be appended with the subscript "a" and the signal asserted in the second clock cycle will be appended with the subscript "b". For example, REQ0# asserted in the first clock cycle is referred to as "REQa0#". Similarly, REQ0# asserted in the second clock cycle is referred to as "REQb0#".

In the Error Phase, AERR# is asserted if the request signals contain a parity error. The assertion of AERR# aborts the transaction in progress and requires the agent issuing the transaction to restart it from Arbitration Phase. AERR# assertion also requires all agents to re-synchronize their arbitration state to allow "auto-correction" due to parity errors occurring from arbitration failures.

In the Snoop Phase, the signals used to provide snoop results in the preferred embodiment are HIT# and HITM#. HIT# is asserted by every caching agent having the requested data in Shared or Exclusive (defined below) state to indicate to the requesting agent that the requested data should be entered into its cache in a Shared state. HITM# is asserted by any caching agent which has the requested data in Modified state (defined below). If HITM# is asserted during the Snoop Phase, the requesting agent, the snooping agent and the memory agent are notified that a special transaction must take place called an Implicit Writeback so that data coherency may be preserved as discussed in reference to FIGS. 5 and 6.

If any agent needs additional time to complete a snoop, both HIT# and HITM# can be asserted simultaneously to delay the Snoop Phase for two cycles. This will temporarily stall the request pipeline, but will not require it to be flushed. Additionally, if the responding agent determines that the requested data is not immediately available, it can assert a DEFER# signal which provides the responding agent with the option of later restarting the transaction and provide the requested data or having the requesting agent retry the transaction.

The Response Phase indicates the end of a transaction and that the Response/Snoop Initiated Data Phase has begun. The signals, RS[2:0]# are used to indicate that the Response Phase has been entered and to deliver the results of the transaction. These "response results" are listed in Table A below:

TABLE A

| RESPONSE RESULTS | | | |
|---|---|---|---|
| CODED MESSAGE | RS2# | RS1# | RS0# |
| Idle | 0 | 0 | 0 |
| Retry | 0 | 0 | 1 |
| Deferred | 0 | 1 | 0 |
| Reserved | 0 | 1 | 1 |
| Hard Failure | 1 | 0 | 0 |
| No Data | 1 | 0 | 1 |
| Implicit Writeback | 1 | 1 | 0 |
| Normal Data | 1 | 1 | 1 |

The response results remain "Idle" until any one of RS[2:0]# is asserted. "Retry" response is only allowed when DEFER# (with HITM# inactive) is asserted during Snoop Phase. With the Retry response, the response agent informs the requesting agent that the transaction must be retried. "Hard Failure" is a valid response which indicates a transaction failure. The requesting agent is required to take recovery action. "No Data" response is required when no data will be returned by the addressed agent and DEFER# and HITM# are inactive during the Snoop Phase. "Implicit Writeback" is a required response when HITM# is asserted during Snoop Phase. The snooping agent is required to transfer the cache line during the Data Phase. The memory agent is required to drive the Implicit writeback response and accept the modified cache line. "Normal Data" response is required when the bus request during from Request Phase requires a data transfer from the responding agent and both HITM# and DEFER# are deasserted during the Snoop Phase. With "Normal Data" response, the responding agent begins the Data Phase for the transaction coincident with the Respones.

During the Data Phase, a number of bus lines are driven, namely those bus lines associated with D[63:0]#, DEP[7:0]#, DRDY#, and DBSY#. D[63:0]# are data signals each dedicated to propagate one data bit through sixty-four data lines. DEP[7:0]# are parity signals used in conjunction with the D[63:0]#. DRDY# and DBSY# are signals used to coordinate and control the use of data lines D|63:0|#. All Data Phase bus signals, DBSY#, DRDY#, D|63:0|#, and DEP|7:0|# are driven by the data transfer agent. To place data on lines D|63:0|# during clock cycle "n", the data transfer agent must observe DBSY# deasserted during clock cycle "n−1" indicating the data lines will be free during the next transaction. DRDY# is asserted when valid data is placed on data lines D|63:0|#. Additionally, a bus signal "TRDY#" is asserted by the responding agent sometime before the Data Phase for Request-Initiated ("write") transactions to indicate that the responding agent is ready to receive data from the requesting agent. TRDY# is also used to indicate readiness to receive data from a snooping agent containing modified data during an Implicit Writeback transaction.

The following protocol rules dictate the usage of the control signals listed above, which in turn are used to orchestrate a data transfer in the Data Phase. The protocol rules pertaining to the Request Phase are also discussed, as the interaction between the Request Phase and the Data Phase is important to assure a smooth transition between one transaction and the next.

In response to a nth request initiated ("write") transaction, request-initiated TRDY# is asserted when the transaction has write data to transfer a minimum of three clock cycles after the first cycle of the Request Phase, and a minimum of one clock cycle after the Response Phase of the previous n−1$^{th}$ transaction. The responding agent is responsible for asserting the TRDY# signal. Also, a snoop-initiated TRDY# assertion must necessarily occur if snoop results for nth transaction indicate HITM# assertion. The snoop-initiated TRDY# assertion indicates to the snooping agent that the responding agent is ready to accept implicit writeback data.

TRDY# may be deasserted when inactive DBSY# and active TRDY# are observed for one clock cycle. If DBSY# was observed inactive on the clock cycle that TRDY# was asserted, and the next clock cycle is a minimum of three clock cycles from the previous TRDY# deassertion clock edge. TRDY# can be deasserted in the next clock cycle TRDY# need not be deasserted until the response results are provided, unless an Implicit Writeback should occur for a write transaction. The TRDY# for the write data must be deasserted as soon as possible to allow a second. TRDY# assertion for the data associated with the Implicit Writeback.

The response results (Response Phase) are provided for n$^{th}$ transaction after the snoop results for the n$^{th}$ transaction have been provided, and after the response results for the previous n−1$^{th}$ transaction have been provided. If the transaction contains write data, the Response Phase can occur only after TRDY# has been asserted and observed with DSBY# inactive. If the transaction contains write data and involves an Implicit Writeback, the Response Phase can only occur after TRDY# has been asserted for the Implicit Writeback and is observed with DBSY# inactive. If the response results indicate a Normal Data response, the Response Phase can only occur after DBSY# assertion from a previous transaction is observed inactive.

In general, an agent responding to a TRDY# must either provide the data or assert DBSY# one clock cycle after TRDY# is observed active and DBSY# is observed inactive. DBSY# can be asserted to "hold" the data lines if the data is not yet available. If the agent providing the data has observed TRDY#, it may begin writing that data one clock cycle before DBSY# is observed deasserted if it is the agent currently asserting DBSY# and can predict its deassertion beforehand. The Data Phrase for read transfers must begin in the same clock cycle that the Response Phase is driven. This protocol may be shown through a series of illustrative diagrams of various operations.

The system bus used in the preferred embodiment of the invention maintains data coherency by utilizing the MESI cache protocol. MESI cache protocol requires that each caching agent on the system bus associate one of four states with each line of data it caches. These states are "Modified", "Exclusive", "Shared", and "Invalid", hence "MESI". More specifically, a cache line in Modified state indicates that the data has been altered by the caching agent and therefore is different than that available from the memory agent. If the system is operating correctly, this data in the Modified state will be the most recent version of the data available. In addition, a cache line in Exclusive state indicates that the caching agent has data identical to that stored in the memory agent and no other caching agent is currently caching the same data. A cache line in Shared state indicates that its caching agent, other caching agents and the memory agent have a current version of the data. A cache line in Invalid state indicates that data within the cache line is not valid. By requiring each caching agent to perform a snoop based on the information provided during the Request Phase and then assert the results of that Snoop Phase, the MESI cache protocol can be utilized by every transaction on the system bus.

Figure 3:
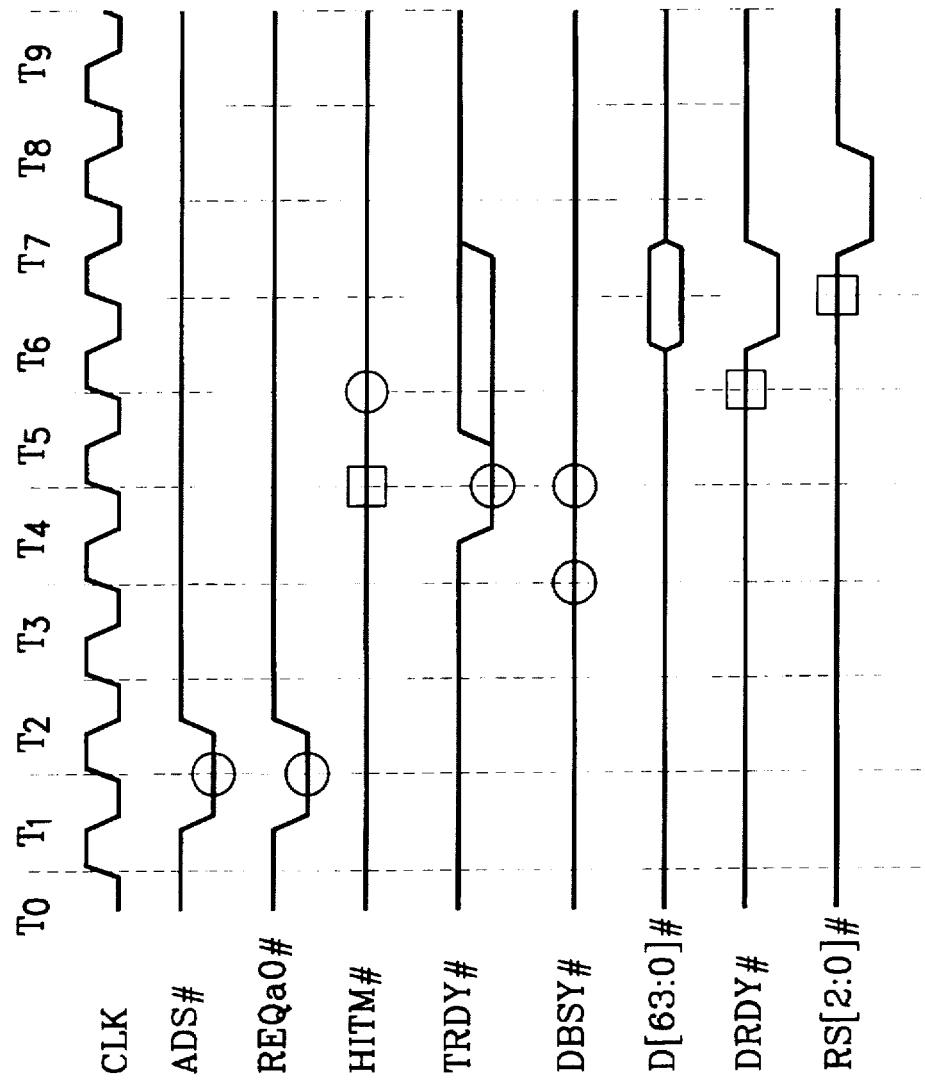
FIG. 3 is an illustrative timing diagram of information signals propagating through the system bus of FIG. 1 in support of a request initiated "write" transaction.

FIG. 3 is a timing diagram illustrating a request initiated data transfer, or a write transaction, where "Tn" indicates a n$^{th}$ clock cycle of a system bus clock ("CLK"). ADS# and REQa0# are the signals used to initiate a transaction request. Throughout the application, all events are asserted one clock cycle before they are observed. For example, ADS# is shown going low, or observed, at time at time T2. This is a result of ADS# being asserted logic low during clock cycle T1 by some agent. This convention is used because it takes one clock cycle for transactions to be observed across the entire bus. Circles are used to indicate observation of a signal while squares are used to indicate assertion.

Referring still to FIG. 3, a request initiated transaction begins when a requesting agent gains control of the system bus and issues a write request during the Request Phase of a transaction as indicated by the assertion of signals ADS# and REQa0# at time T2. The requesting agent then waits until TRDY# is asserted by the agent that will receive that data at time T5, which is usually the memory controller coupled to DRAM. Since the signal HITM# is not asserted at clock cycle T6 during the Snoop Phase, no Implicit Writeback transaction is necessary. Once TRDY# is asserted, the requesting agent determines if DBSY# is asserted, which at time T4 and T5 it is not, and begins supplying data during clock cycle T6 by asserting DRDY# and simultaneously placing the data on lines D|63:0|# during the Data Phase. This is observed in clock cycle T7.

Since the transaction is a partial cache line write involving a single 8-byte chunk, DBSY# need not be asserted because the data lines D|63:0|# will be available during the next clock cycle. If the transaction involved multiple 8-byte chucks, DBSY# would have been asserted at T6 and held asserted until one clock cycle before the last chunk is provided. The response results are asserted for a write transaction after TRDY# is asserted and observed with inactive DBSY#.

Figure 4:
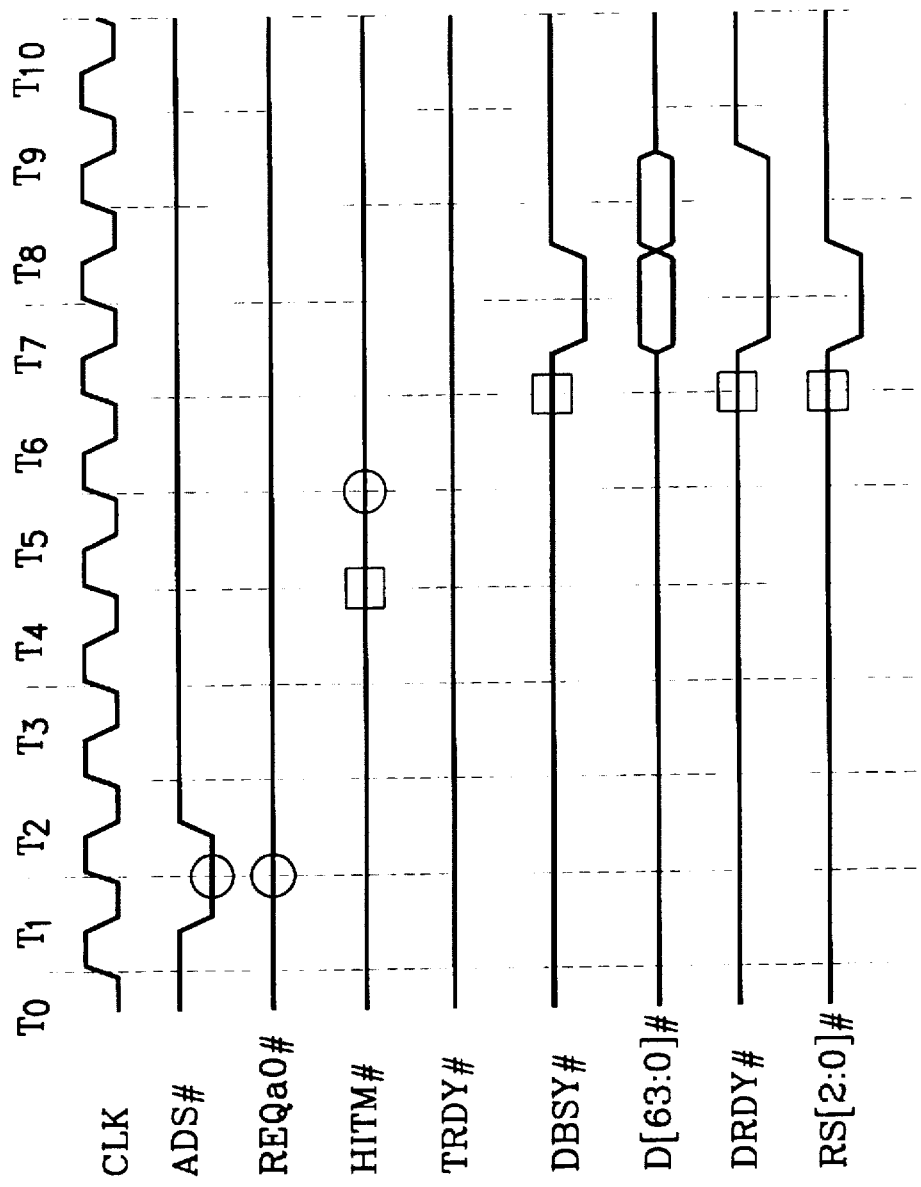
FIG. 4 is an illustrative timing diagram of information signals propagating through the system bus of FIG. 1 in support of a response-initiated "read" transaction.

FIG. 4 is a timing diagram of a response initiated ("read") transaction with data transfer. The read transaction begins when a read request is made during the Request Phase of a bus transaction shown at time T2 by the assertion of ADS# and deassertion of REQa0#. Once the read request is made, the requesting agent waits until DRDY# is asserted indicating valid data has been placed on the system bus before the requesting agent begins reading that data. TRDY# need not be asserted during a response initiated transaction. Since the transaction is a partial cache line read involving two 8-byte chunks, DBSY# is asserted until T8, one clock cycle before the clock cycle where the second chunk would be provided. During a read transaction, the response results are asserted one clock cycle after the snoop results are observed and DBSY# is observed inactive.

Figure 5:
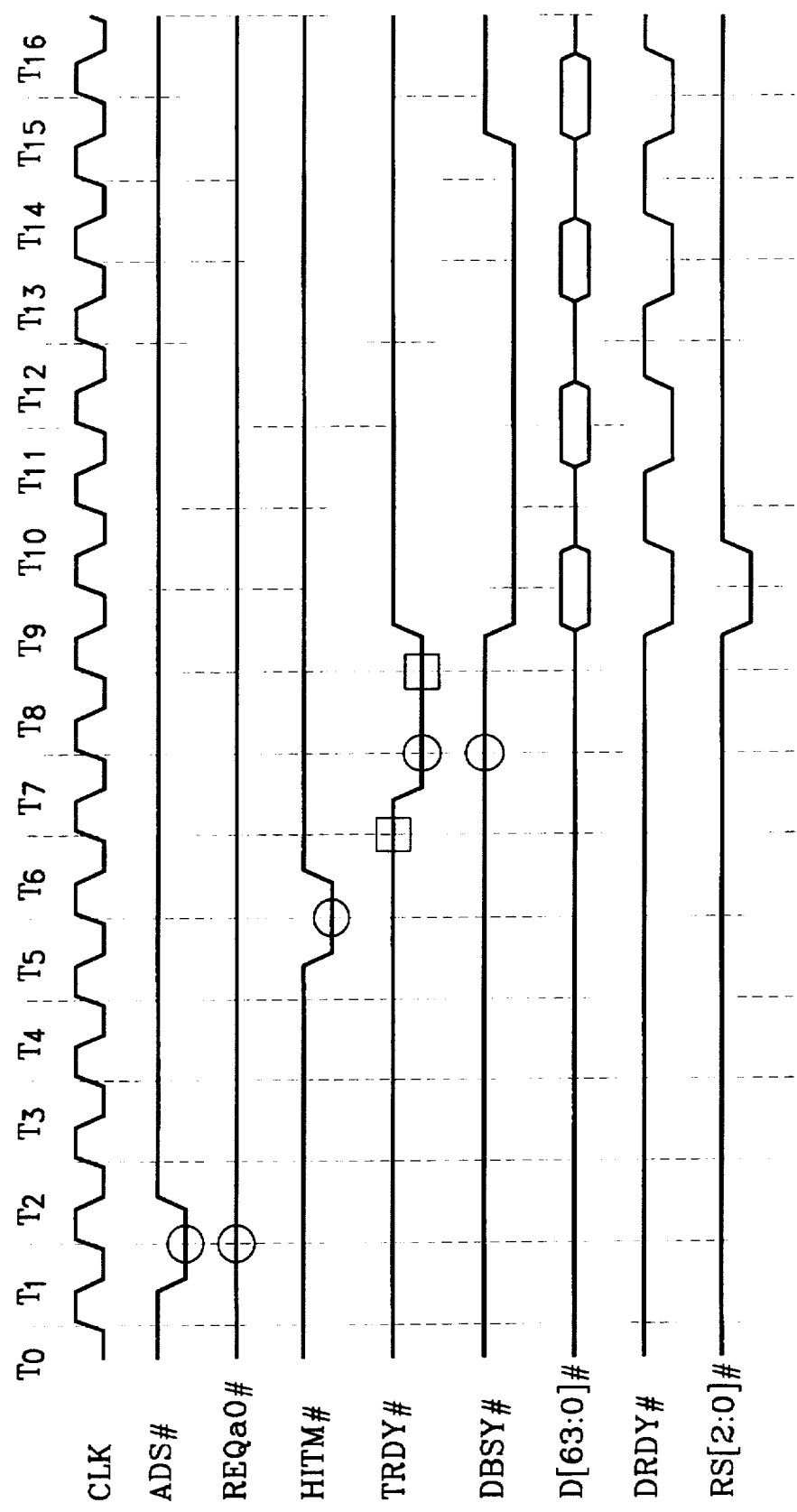
FIG. 5 is an illustrative timing diagram of information signals propagating through the system bus of FIG. 1 in support of an Implicit Writeback transaction being performed during a read transaction.

FIG. 5 is a timing diagram of a response initiated transaction with data transfer involving an Implicit Writeback. The transaction begins with the assertion of ADS# and deassertion of REQa0# at T2 which is indicative of a read transaction. A caching agent then snoops its own cache and when it detects that it has the most recent version of data requested, it indicates its ownership of that data by asserting HITM# at T6 during the Snoop Phase of the transaction. The snooping agent then becomes responsible for providing the data to the requesting agent. Once HITM# is asserted, the responding agent becomes responsible for asserting TRDY# to receive the data from the caching agent, even though previously there was no need to do. This is done in T7 and observed at T8. The snooping agent detects the assertion of TRDY# and begins providing data by placing the data on lines D[63:0]#, and asserting DBSY# and DRDY#. Because the caching agent in this instance can only provide chunks of data every other clock cycle, DRDY# is only asserted every other clock cycle. DBSY# is observed deasserted, at the earliest, one clock cycle before the last chunk of data is observed at T16. The request results are asserted at clock cycle T9 and observed at T10 after TRDY# is observed asserted and DBSY# is observed deasserted at clock cycle T8.

Figure 6:
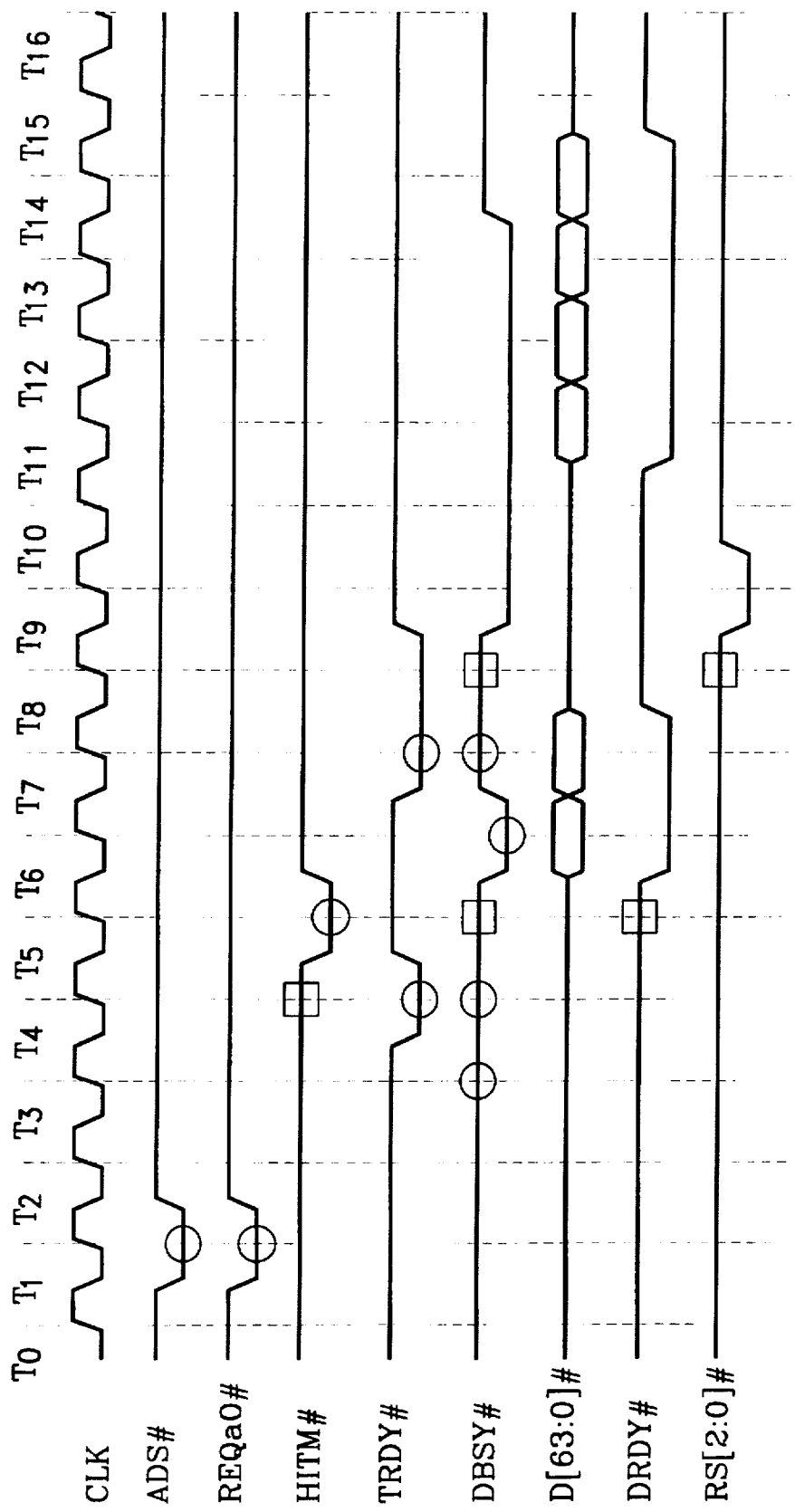
FIG. 6 is an illustrative timing diagram of information signals propagating through the system bus of FIG. 1 in support of an Implicit Writeback transaction being performed during a write transaction.

FIG. 6 is an illustrative timing diagram showing an Implicit Writeback occurring during a write transaction. When an Implicit Writeback occurs during a write transaction, two data transfers are necessary. The first is the normal request initiated write and the second is the Implicit Writeback. The receiving agent, normally the memory agent, will receive both writes and merge the information into one cache line that will be entered into memory.

Once the write request is issued at time T2 by assertion of ADS# and REQa0#, the responding agent asserts a first TRDY# after three clock cycles have passed at T5. HITM# is observed at T6 indicating an Implicit Writeback will be necessary. This second TRDY# assertion, also done by the receiving agent, is observed at T8 and occurs after the snoop results are observed at T6, and after the first TRDY# has been deasserted at T6 so that the two assertions can be distinguished. The requesting agent begins providing data after the first TRDY# is asserted at T5 by asserting DRDY# and DBSY# and placing the data on lines D[63:0]#. The snooping agent must wait until it detects DBSY# deasserted at T8 indicating the request-initiated data transfer is complete before it, in turn, asserts DBSY# at T10 indicating its intention of providing data. Note that although DBSY# is asserted at T10, data is not actually provided until T12 as indicated by the assertion of DRDY#. The response results are placed on the system bus at T10 indicating Implicit Writeback Response.

Figure 7:
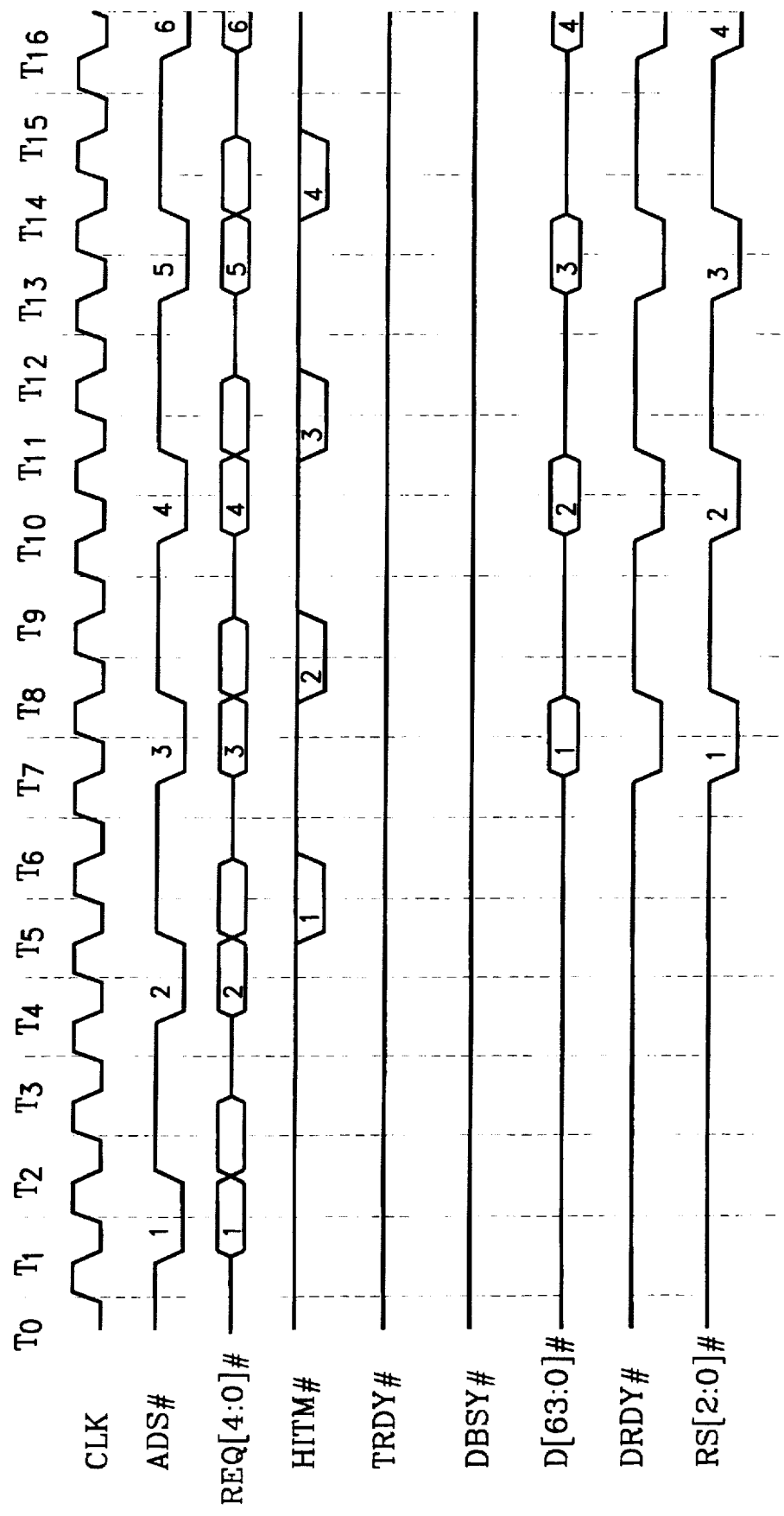
FIG. 7 is an illustrative timing diagram of information signals propagating through the system bus of FIG. 1 in support of multiple partial cache line read transactions.

FIG. 7 is a timing diagram that shows multiple partial line read transactions occurring in a steady state fashion. Since only one chunk of data is being written during each transaction and is available at Response time, DBSY#is not required to be asserted. As shown by the diagram, it is possible for a read to occur every three clock cycles in this steady state.

Figure 8:
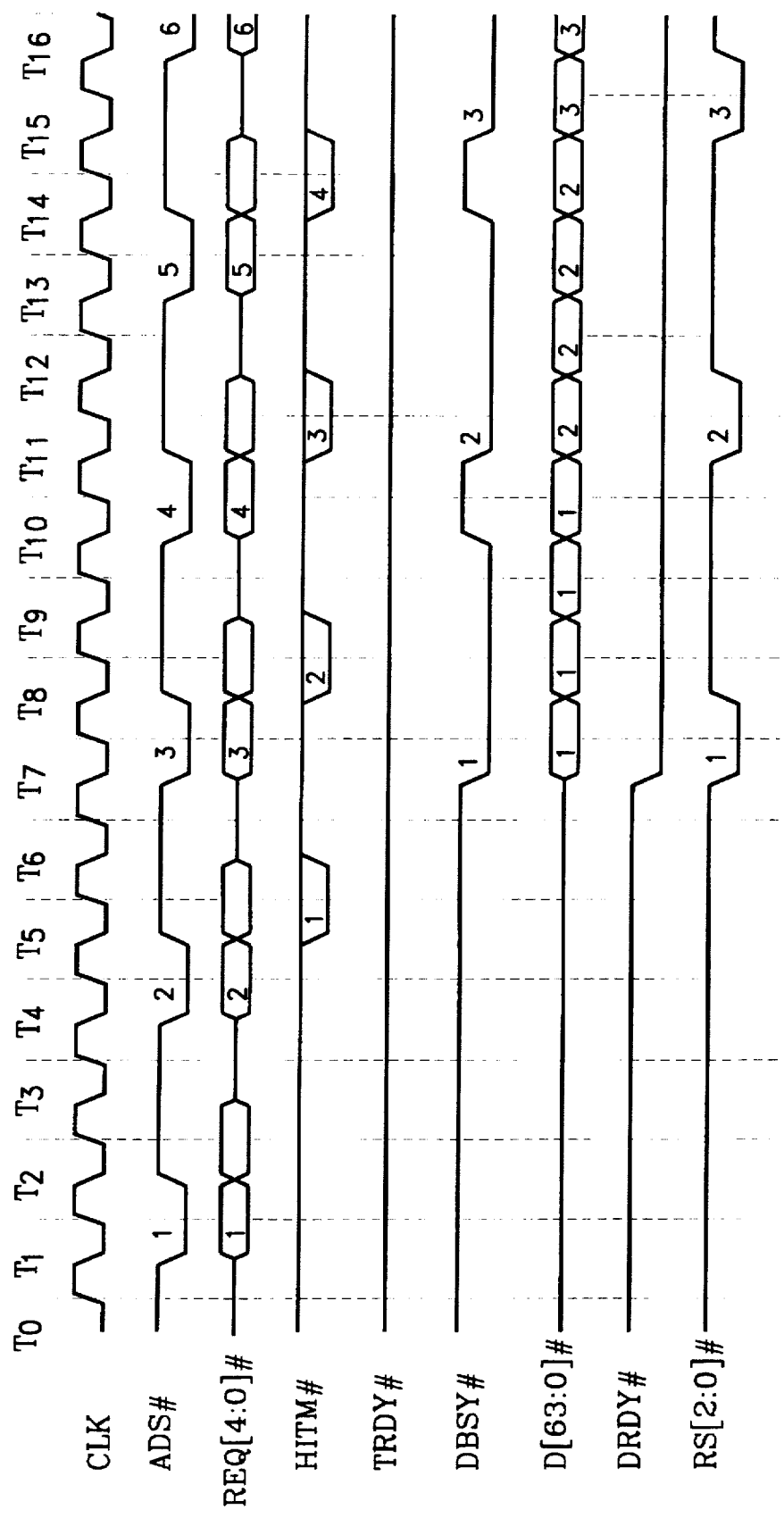
FIG. 8 is an illustrative timing diagram of the information signals propagating through the system bus of FIG. 1 in support of multiple cache line read transactions from the same agent.

FIG. 8 shows the steady-state behavior of full cache line reads occurring back-to-back from the same agent. The response and data transfers for transaction 1 occur in T8, two clock cycles after the Snoop Phase. The data is transferred in 4 consecutive two clock cycle time frames. DBSY# is asserted for transaction 1 in T8 and remains asserted until T11, the clock cycle before the last data transfer. Consecutive data transfers may occur without an intermediary turnaround cycle only if data is being provided from the same agent. This is due to the fact that the data bus does not require a turnaround clock normally needed for two different agents driving the same bus. The agent can anticipate when it deasserts DBSY# at clock cycles T11 and T15, and begin the Data Phase for the next transaction without losing a clock cycle. TRDY# is not asserted because there are read transactions and the snoop results indicate no Implicit Writeback data transfers. Note the first data transfer must occur in the same clock cycle as the Response Phase, which is indicated by the assertion of signals RS[2:0]#. DBSY# for the previous transaction must be deasserted before the response for the current transaction can be driven, provided the response is the "Normal Data" or Implicit Writeback response.

Figure 9:
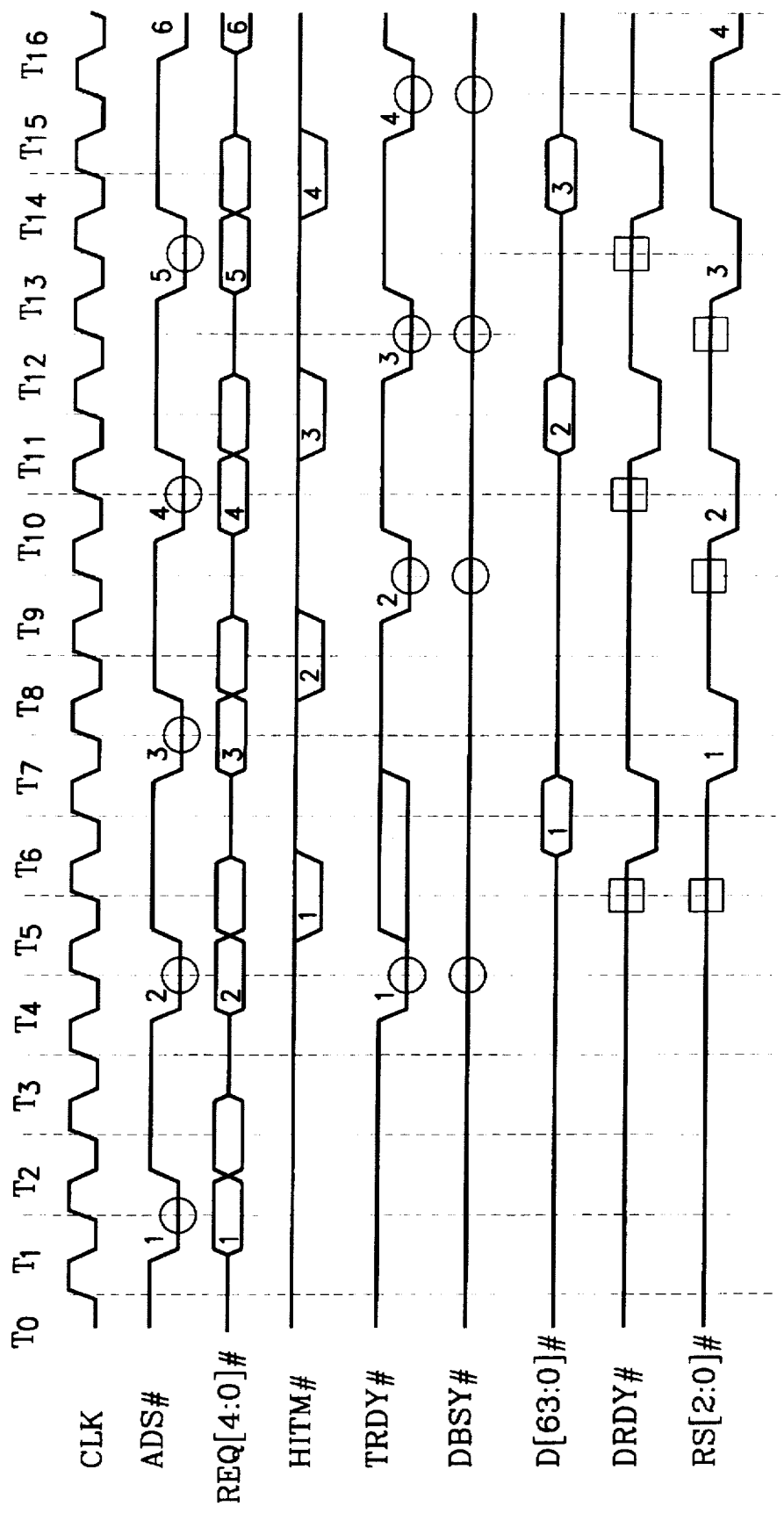
FIG. 9 is an illustrative timing diagram of information signals propagating through the system bus of FIG. 1 in support of multiple partial cache line write transactions.

FIG. 9 shows the steady-state behavior of the system bus with full speed partial write transactions. The first transaction occurs on an idle system bus and looks just like the simple write case in FIG. 3. TRDY# is asserted in T5, three clocks after the ADS# and the REQ[4:0]# are deasserted. The response results are asserted in T8 after an inactive HITM# is observed in T6 indicating no Implicit Writeback. TRDY# is observed active and DBSY# is observed inactive at T5. Therefore the data transfer can begin in T7 as indicated by DRDY# being asserted. Since the data transfer only takes one clock cycle, DBSY# is not asserted. The TRDY# for the second transaction must wait until the response results for the first transaction are sampled. TRDY# is asserted the clock cycle after the response results are observed. Because the snoop results for the second transaction have been observed in T9, the response may be driven in T11. TRDY# is observed with DBSY# deasserted in T10 and data is driven in T12.

Figure 10:
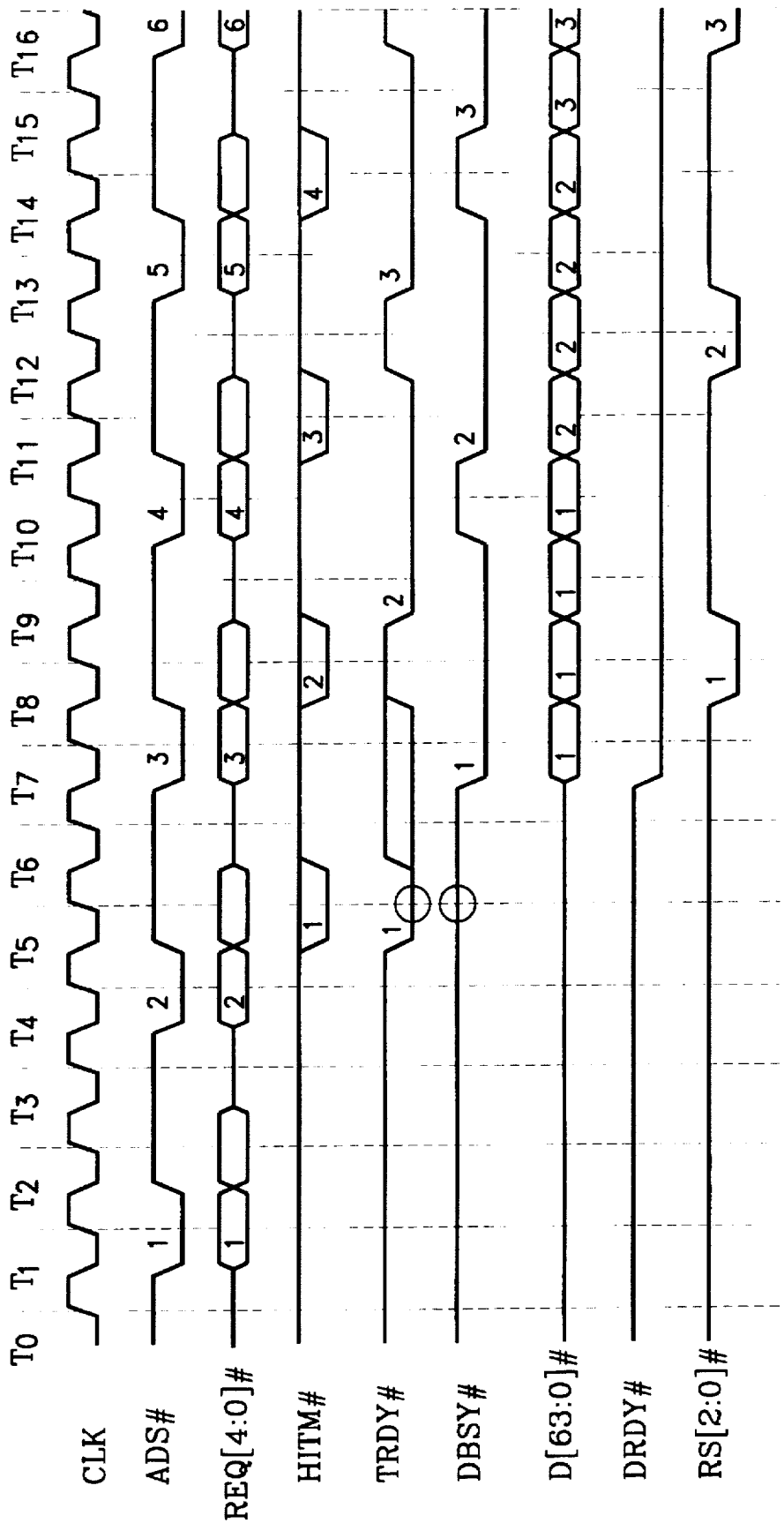
FIG. 10 is an illustrative timing diagram of the pipelined bus of FIG. 1 supporting multiple cache line write transactions.

FIG. 10 shows the steady-state behavior of the bus with full speed, full line write transactions with data transfers between only two agents. The first transaction occurs on an idle system bus. TRDY# is delayed until T6. The response results can be driven in T8 after inactive HITM# observed in T6 indicates no Implicit Writeback, but it is driven in T9 for this example. TRDY# is observed active and DBSY# is observed inactive in T6. Therefore the data transfer can begin in T8 as indicated by DBSY# assertion.

TRDY# for the second transaction can be driven the clock cycle after the response results are driven, if RS[2:0]# and TRDY# both come from the same agent. A special optimization can be made when the same agent drives both request initiated data transfers. Since in T11 the requesting agent deasserts DBSY#, samples TRDY# asserted for transaction 2 and owns the data transfer for transaction 2, it can drive the next data transfer in T12, one clock after DBSY# is deasserted. In T12, the agent receiving the data samples TRDY# active and DBSY# inactive and accepts the data transfer starting in T12. Because the snoop results for transaction 2 have been observed in T9, the responding agent is free to drive the response in T12.

Note that no wait states are inserted by the requesting agent. The back end of the bus will eventually throttle the front end in this scenario, but full bus bandwidth is attainable. In one embodiment the microprocessor always inserts a turn-around cycle between write data transfers, even though it can be avoided in some instances.

To preserve data coherency between two pipelined transactions during an Implicit Writeback transaction, the agent that originally requested the transaction (i.e., the requesting agent) picks up snoop responsibility for the cache line after observing the Snoop Phase of this first transaction. The requesting agent also always observes the Response Phase to determine if the Implicit Writeback, a snoop-initiated transfer, contains additional data beyond what is requested. For example, if the original request is a Partial Line Read Transaction, i.e. a transaction that only needed part on an entire cache line, the requesting agent obtains the needed data from the first 8 byte chunk of the cache line writeback, which contains 32 bytes. If the original request is a Read line or Read Invalidate Line Transaction ( a transaction informing all other caching agents to place the data into an Invalid state), the requesting agent absorbs the entire line. If the original request is an Invalidate Line Transaction and the line is modified in another cache, then the requesting agent updates its internal cache line with the updated cache line received in the snoop-initiated Data Phase. If the original Invalidate Line Transaction receives a Deferred Response, a HITM# in the Snoop Phase of the Deferred Reply transaction indicates data will return, and the requesting agent updates its internal cache with the data. When the requesting agent accepts snoop responsibility for a cache line and immediately drops that responsibility in response to a subsequent transaction, it is allowed to use the cache line exactly once for internal use, before performing an Implicit Writeback.

In addition to having other agents snoop their caches during a read/write transaction, the requesting agent may snoop its own cache. This self-snooping allows the requesting agent to snoop its own transaction request and present the snoop result during the Snoop Phase. If the snoop hits a "Modified" cache line in the requesting agent's cache, the requesting agent asserts HITM# and becomes responsible for the snoop-initiated Data Phase. The memory agent does not distinguish between an Implicit Writeback due to self-snooping or Writeback dueWriteback due to normal snooping. In either case, the addressed memory agent remains the responding agent and also receives the Implicit Writeback and merges it with any write data.

For example, when the requesting agent accesses a certain type of data called a bus-lock variable, the cache line is evicted from the internal cache as part of the Bus Lock Transaction without requiring an internal cache lookup before issuing the bus transaction. The transaction therefore requires self-snooping. Self snooping is also required if a page table entry (i.e., a page attribute) defines the accessed variable as non-cacheable (data that should not be stored in cache memory). In this case, the transaction is issued to the system bus without performing an internal cache lookup. Due to page table aliasing or other reasons, the cache line can still be in its internal cache. In this case, it is written back from the cache as part of the bus transaction.

As briefly stated, the snooping agent is the agent that asserts HITM# during the Snoop Phase of the transaction. The snooping agent also has certain responsibilities to preserve data coherency between two pipelined transactions during an Implicit Writeback. Upon asserting HITM#, the snooping agent accepts responsibility for the transaction's Implicit Writeback. The snooping agent waits for the snoop initiated TRDY# assertion from the memory agent and begins the Implicit Writeback data transfer with the assertion of DBSY# precisely two clocks from active TRDY# (and inactive DBSY#) synchronized with Implicit Writeback response assertion by the memory agent.

Whether a TRDY# assertion is snoop-initiated or request initiated, is determined by the type of request with which the transaction was originated. For a write transaction, the first TRDY# assertion always requests the write data transfer (request initiated data transfer) and optionally the second TRDY# assertion requests the Implicit Writeback data transfer (snoop-initiated data transfer). If the snooped transaction writes a full cache line, the snooping agent may or may not send the Implicit Writeback data.

The agent that the transaction was originally directed towards, usually the agent controlling the DRAM is called the addressed memory agent. The addressed memory agent also has certain responsibilities to preserve data coherency between two pipelined transactions during an Implicit Writeback. On observing HITM# active in the Snoop Phase, the addressed memory agent remains the responding agent but changes its response to an Implicit Writeback response. If the transaction contains a request initiated data transfer (write), it remains responsible for TRDY# assertion to indicate that the write data transfer can begin.

If the snooped transaction is a request initiated data transfer and contains a snoop-initiated data transfer (e.g., modified line writeback), the transaction will contain two data transfers. After the TRDY# assertion and deassertion for the request initiated TRDY# is complete, the memory agent asserts a snoop initiated TRDY# once it has a free cache line buffer to receive the Modified line writeback. Precisely two clocks from active TRDY# and inactive DBSY#, the memory agent drives the Implicit Writeback response synchronized with the DBSY# assertion by the snooping agent for the Implicit Writeback data transfer of the agent. Additionally, the memory agent is responsible for merging the write data with the writeback cache line. The memory agent then updates main memory with the most recent cache line data.

Figure 11:
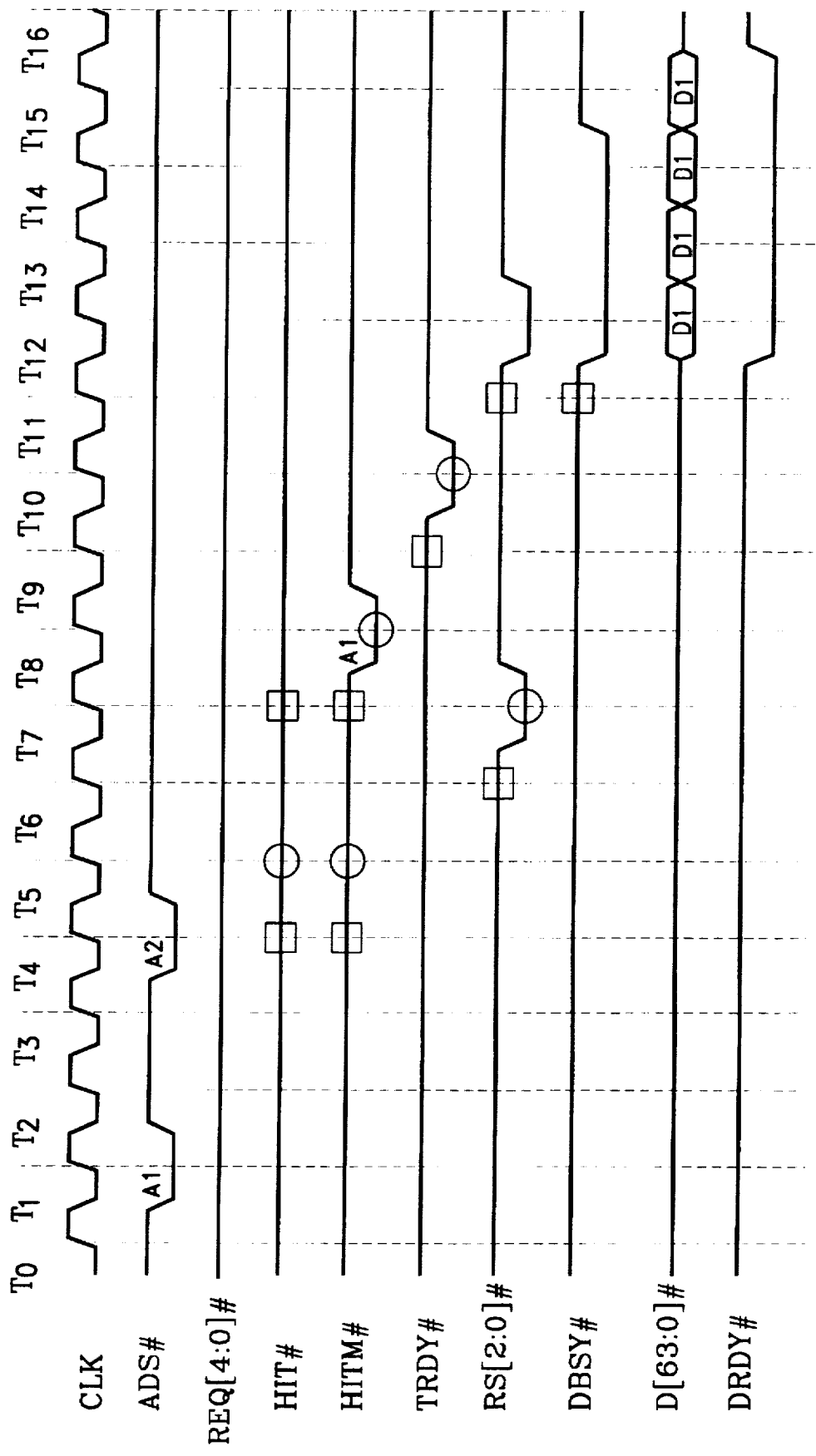
FIG. 11 is an illustrative timing diagram of information signals propagating through the system bus of FIG. 1 in support of two sequential bus transactions requesting ownership to modify the same data.

FIG. 11 is a timing diagram illustrating the situation where two sequential (i.e., back-to-back) pipelined transactions request the same data location, and therefore how data coherency is preserved while the pipeline is maintained. A first bus agent ("A1") initiates a first invalidate line transaction at clock cycle T2 by asserting a logic-low ADS#. An invalidate line transaction signals all other memory agents on the system bus to place this data location into an Invalid state because A1 wishes to modify this data. Three cycles later, a second bus agent ("A2") makes a request for the same address also indicated by a logic low on ADS#. In the preferred embodiment of the system bus incorporating the invention, A1 observes this second request and determines that it is for the same data location it requested in the first transaction. Since A1 assumes ownership of this data location after the Snoop Phase of the first transaction, A1 will provide the proper snoop result, asserting a HITM# during the Snoop Phase of the second transaction.

Asserting HITM# during the Snoop Phase of the second transaction notifies A2, as well as any memory agents on the system bus, that A1 will provide the necessary data during the Data phase. The Response Phase of the first transaction occurs during clock cycle T8 indicating the completion of the first transaction. During clock cycle T11, A2 indicates that it is ready to receive the addressed data by the assertion of TRDY#. Two clock cycles later, A1 begins providing that data by asserting RS[2:0]#, DBSY# and D[63:0]#. Thus, data coherency is preserved through two pipelined transactions requesting the same data.

Long latency transactions are also supported in the preferred embodiment of the invention. Any agent responsible for providing requested data, but not capable of doing so at the time of the request, can assert a DEFER# signal during the Snoop Phase, unless the request including information indicated that the DEFER# signal was not appropriate. This is an example of a long latency transaction. Provided that no other agent asserted HITM#, this will cause a unique defer response to be entered during the Response Phase of the present transaction, and for the data transfer to be postponed until the responding agent (i.e., the agent asserting DEFER#) determines that it can provide the data and starts a new operation. The defer operation is useful because it prevents requesting agents from having to issue periodic requests for data that is not yet available. This eliminates unnecessary bus transactions, and in some cases can prevent race conditions where some agents have to waste their priority issuing unsuccessful retry transactions.

Precisely one agent is the memory agent or I/O agent in a deferred operation. In order for this memory addressed agent to respond with a deferred response, the DEFER# signal is asserted during the Snoop Phase of the transaction. This action gives the requesting agent an earlier indication that the transaction might be deferred and that in-order completion cannot be guaranteed. As a result, the requesting agent must stop issuing subsequent order-dependent transactions until the deferred operation is successfully completed. Note that HITM# active in the Snoop Phase overrides an active DEFER# signal, because another caching agent has taken over responsibility for in-order completion of the transaction with an Implicit Writeback.

Just as with the Implicit Writeback Transaction, preserving memory ordering and clearly defining snoop responsibilities during a defer operation are critical to ensuring a deferred operation can be accomplished while maintaining the bus pipeline and preserving data coherency in the multi-processor system. Once DEFER# is asserted for a transaction in the Snoop Phase, and if the responsibility remains with the memory agent or the I/O agent (HITM# inactive), that agent also assumes snoop responsibility for the cache line (instead of the requesting agent) for the subsequent accesses to that line. Note that DEFER# is also asserted in the Snoop Phase if the addressed agent intends to respond with a retry response (also assuming HITM# inactive). Once DEFER# is asserted for a transaction and HITM# is inactive, the memory or I/O agent is required to either cancel the transaction (with a retry response) or give it a deferred response during the Response Phase.

Figure 12:
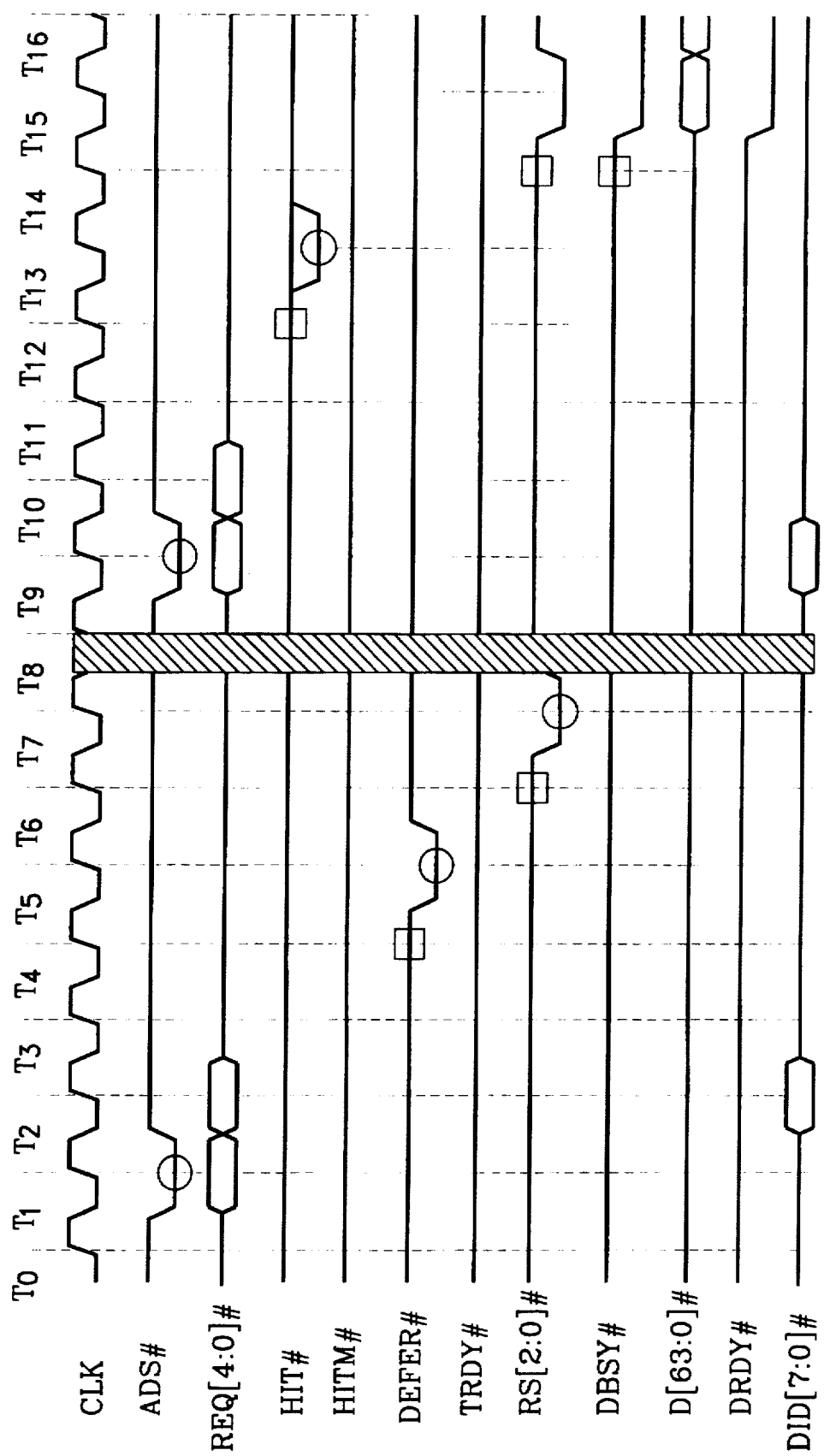
FIG. 12 is an illustrative timing diagram of information signals propagating through the system bus of FIG. 1 in support of a deferred response to the deferred reply transaction.

FIG. 12 illustrates a deferred response followed by the corresponding Deferred Reply for a read operation. In T2, the requesting agent asserts ADS# and drives the REQ[4:0]# as it issues a Read Line request. In T5 and T6, during the Snoop Phase, the agent to which the request was addressed (i.e., "responding agent") determines that the transaction cannot be completed in order and hence asserts DEFER# at T6. Since HITM# is observed inactive in T6, the responding agent returns a "Deferred" response by asserting the proper encoding on RS[2:0]# in T8.

Before T10, the responding agent obtains the data required in the deferred request. In T10, the original responding agent issues a Deferred Reply transaction, using the value latched from device identification "DID[7:0]#" signals in the original transaction as the address. In T13, the responding agent drives a valid level on the HIT# signal to indicate the final cache state of the returned line. The original requesting agent assumes snoop responsibility. In T15, the original requesting agent drives normal completion response and also begins the Data Phase.

In T11, the original requesting agent observes the Deferred Reply Transaction. It matches the DID[7:0]# to the deferred identifier stored with the original request in its outstanding transaction queue. The original requesting agent observes the final state of the returned cache line in T14. In T16, it observes the transaction response and removes the transaction from the outstanding transaction queue and an in-order queue ("IOQ") shown in FIG. 14. This completes the entire deferred operation sequence.

To maintain data coherency, snoop ownership must be clearly defined during a defer operation. After asserting DEFER# in the Snoop Phase of a cache-line transaction, the responding agent also accepts the snoop ownership of that cache line within a bus cluster as shown in FIG. 1. Thus on a subsequent access to the same cache line within the bus cluster, the responding agent can take two potential actions; namely (i) data and (ii) retry. A retry response is issued by the responding agent during the Response Phase to cancel the conflicting transaction. This mechanism provides a means by which an agent can provide functionally correct behavior. Optionally, the responding agent can avoid having multiple retry requests by issuing a DEFER# signal and taking full responsibility for the cache line state within the bus cluster. The responding agent issues the Deferred Reply Transaction to the first requesting agent. Before returning a deferred reply to the next requesting agent of the same cache line, it issues an Invalidate transaction to explicitly invalidate the cache line from the first requesting agent's cache if required by the deferred reply completion of the second request.

The responding agent can also initiate an Invalidate Line Transaction as a result of a request from another system bus coupled to the described cluster prior to completion of the deferred reply of the original request. In this case, it has ordered an inbound transaction from the system bus ahead of an outbound transaction from the bus. This mechanism is used by cluster bridges (e.g., the cluster bridge of FIG. 1) as a mechanism to eliminate the race condition between conflicting accesses to the same cache line from multiple bus clusters and allows multiple bus clusters to be connected.

Figure 13:
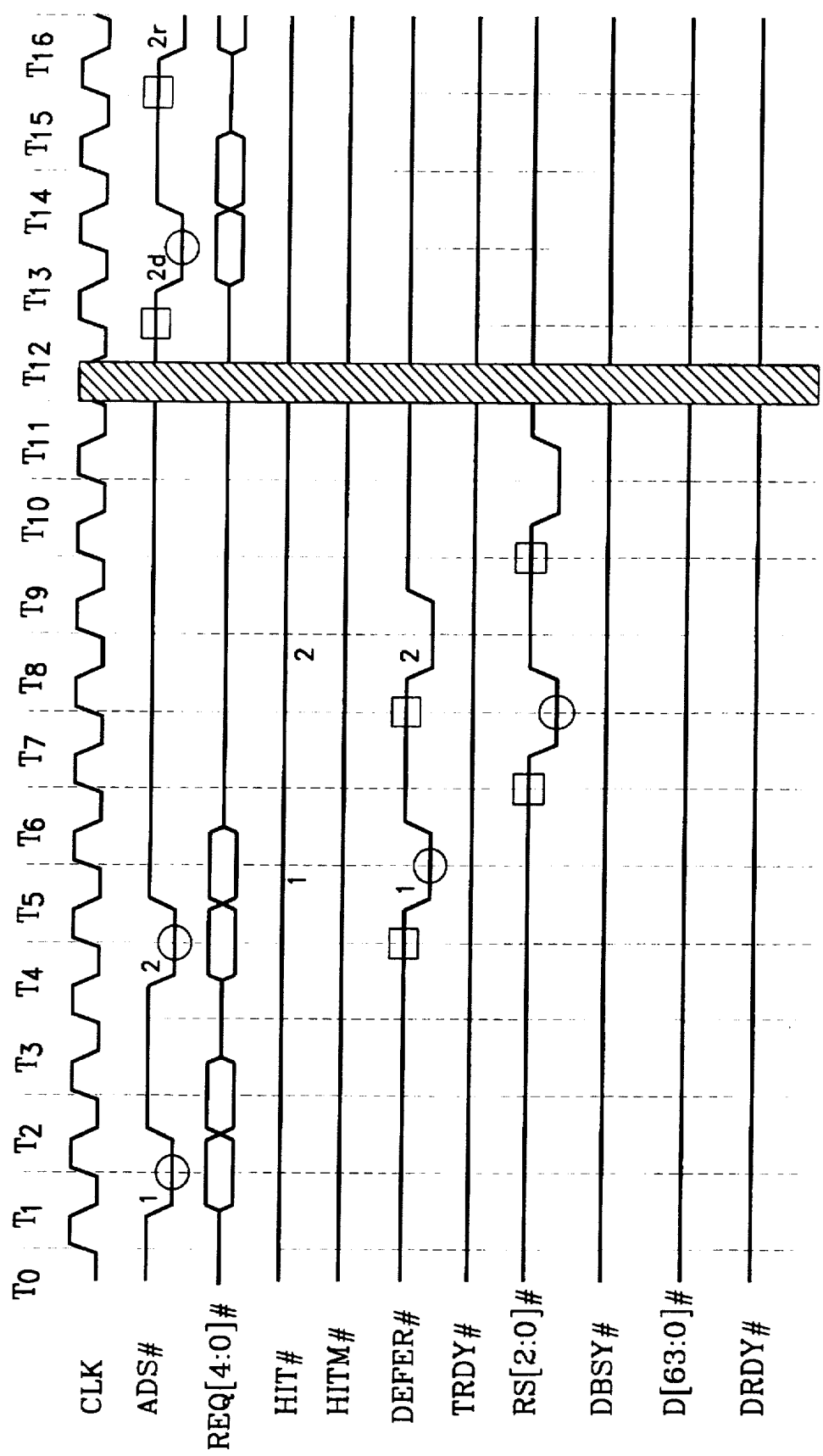
FIG. 13 is an illustrative timing diagram of information signals propagating through the system bus of FIG. 1 in support of the snoop responsibility for a deferred transaction.

FIG. 13 illustrates the effect of snoop ownership pickup by the responding agent when it gives a deferred response to the first Invalidate Line request. In the absence of the deferred response, snoop ownership immediately transfers to the requesting agent. In T2, the requesting agent ("1") asserts ADS# and drives the REQ[4:0]# to issue a first Invalidate Line request. In T5, a different requesting agent ("2") asserts ADS# and drives the REQ[4:0]# to issue a second Invalidation Line request to the same cache line.

The memory agent asserts DEFER# in the Snoop Phase and Deferred Response in the Response Phase to indicate that the first Invalidation Line request will be given a deferred response. It also observes the second Invalidation Line request and notes that the requested address is the same as a cache line for which it has asserted DEFER#. Noting the conflicting address, it asserts DEFER# in the Snoop Phase and Retry Response in the Response Phase to indicate that the second response will be retried. All subsequent attempts by the different requesting agent to reissue the second request are given retry response by the memory agent.

In T6, the requesting agent observes DEFER# active and notes that the transaction has not been committed for in-order completion. It does not accept ownership of the cache line. As a result, it does not assert HITM# in T8, the Snoop Phase of the second transaction. In T9, the different requesting agent observes DEFER# active and notes that the transaction has not been committed for in-order completion and remains in Invalid state for the cache line.

After the memory agent obtains ownership of the cache line within the bus cluster, it initiates a deferred reply transaction 2d in T14. In T15, the different requesting agent reissues Request "2r". This time the memory agent does not generate a retry response for transaction "2r". On observing request "2r", the requesting agent, who picked up cache line ownership in T17, completes it similar to FIG. 12.

Figure 14:
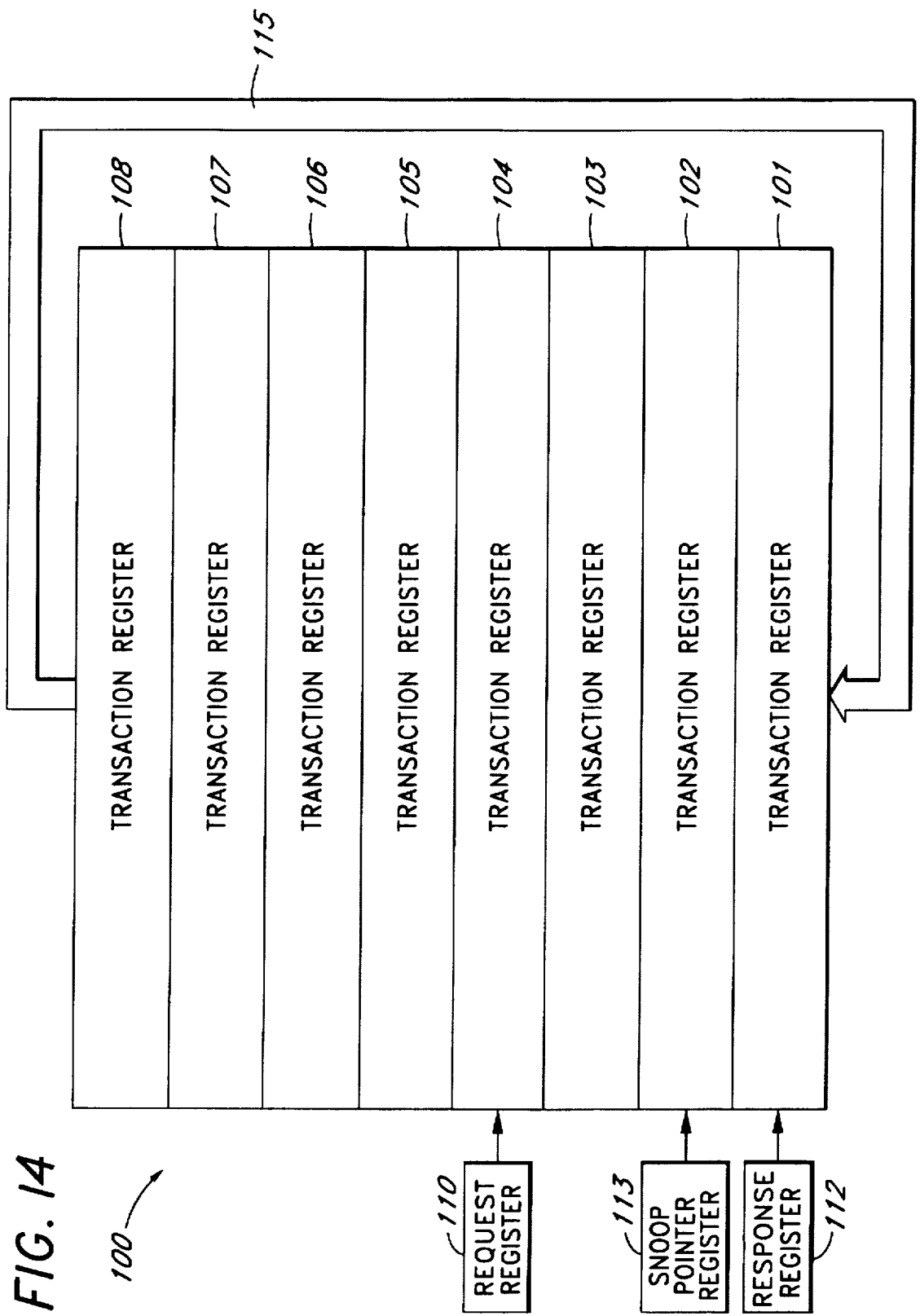
FIG. 14 is a block diagram illustrating an in-order queue implemented into the agents of FIG. 1 for use in monitoring a state of the system bus of FIG. 1.

FIG. 14 is a block diagram of an "in-order queue" incorporated into each agent coupled do the pipelined bus. In order to support multiple outstanding transaction on the system bus, each agent must keep track of certain minimal information so that the information being placed on the system bus at any particular time can be identified, and the agents involved in the transaction known. The in-order queue ("IOQ") 100 stores this information. The IOQ 100 includes a plurality of transaction registers, for example, eight transaction registers 101–108, two queue pointer registers 110 and 112, a snoop pointer register 113, and an "empty" register 114. The arrow 115 running from the bottom of the IOQ 100 to its top indicates the IOQ 100 is circular so that when a first queue pointer (i.e., "request") register 110 is pointing to the transaction register 108 and the request register 110 is incremented, it will then be pointing to the transaction register 101.

Although eight transaction registers are used in the preferred embodiment, more or less registers may be used. These transaction registers 101–108 include fields such as a data transfer field to indicate that it is supporting a data transfer, an implicit writeback field to indicate assertion of HITM# by a caching agent for the transaction, a read/write field to indicate that its a read or write transaction and the like.

As bus transactions are issued onto the system bus, they are entered into the transaction register pointed to by the request register 110, and then the request register 110 is incremented. After the Response Phase for a transaction is received, the transaction at the top of the IOQ 100 is removed and a second queue pointer "response" register 112 is incremented. The response register 112 always lags behind the request register 110. In addition, the snoop pointer register 113 points to the transaction currently being snooped.

When both queue pointer registers 110 and 112 point to the same transaction register and empty register 114 is inactive, the IOQ 100 is full. However, if the empty register 114 is active, the IOQ 100 is empty. If no transactions are outstanding, the empty register 114 is set. Barring a parity error, transactions receive their responses and data in the same order that they are issued, so each transaction at the top of the IOQ 100 is the next to enter the Response and Data phases, the last phases before the transaction is complete.

Preferably, each agent stores at minimum the following information in its IOQ: the number of transaction outstanding; what transaction is next to be snooped; what transaction is next to receive a response; and if the transaction was issued to or from this agent. Other, agent specific, bus information must be tracked as well, however, not every agent need track this information. For example, a requesting agent might track: how many more transactions can this agent still issue (note: in the preferred embodiment the microprocessor can have four outstanding transactions); is this transaction a read or a write; and does this bus agent need to provide or accept data. A responding agent might track: does this agent own the response for the transaction at the top of the IOQ; does this transaction contain Implicit Writeback data and does this agent have to receive the writeback data; if the transaction is a read; does this agent own the data transfer; if the transaction is a write, must this agent accept the data; and availability of buffer resources so the agent can stall further transactions if it needs to. A snooping agent might track if the transaction needs to be snooped, if the Snoop Phase needs to be extended; does this transaction contain Implicit Writeback data to be supplied by this agent; and how many snoop requests are in the queue. Additionally, agents whose transaction can be deferred might track the deferred transaction and its agent ID, and availability of buffer resources. In the preferred embodiment, this type of transaction information can be tracked by implementing multiple queues or one all encompassing IOQ.

There are certain additional situations where access conflicts can occur that threaten cache coherency. These primarily occur when an outgoing transaction has the same address as the current bus transaction. To better understand this, the conceptual buffer structure where outgoing transactions are stored used in the preferred embodiment of the invention is first described, and then the approach used to resolve conflicts.

Figure 15:
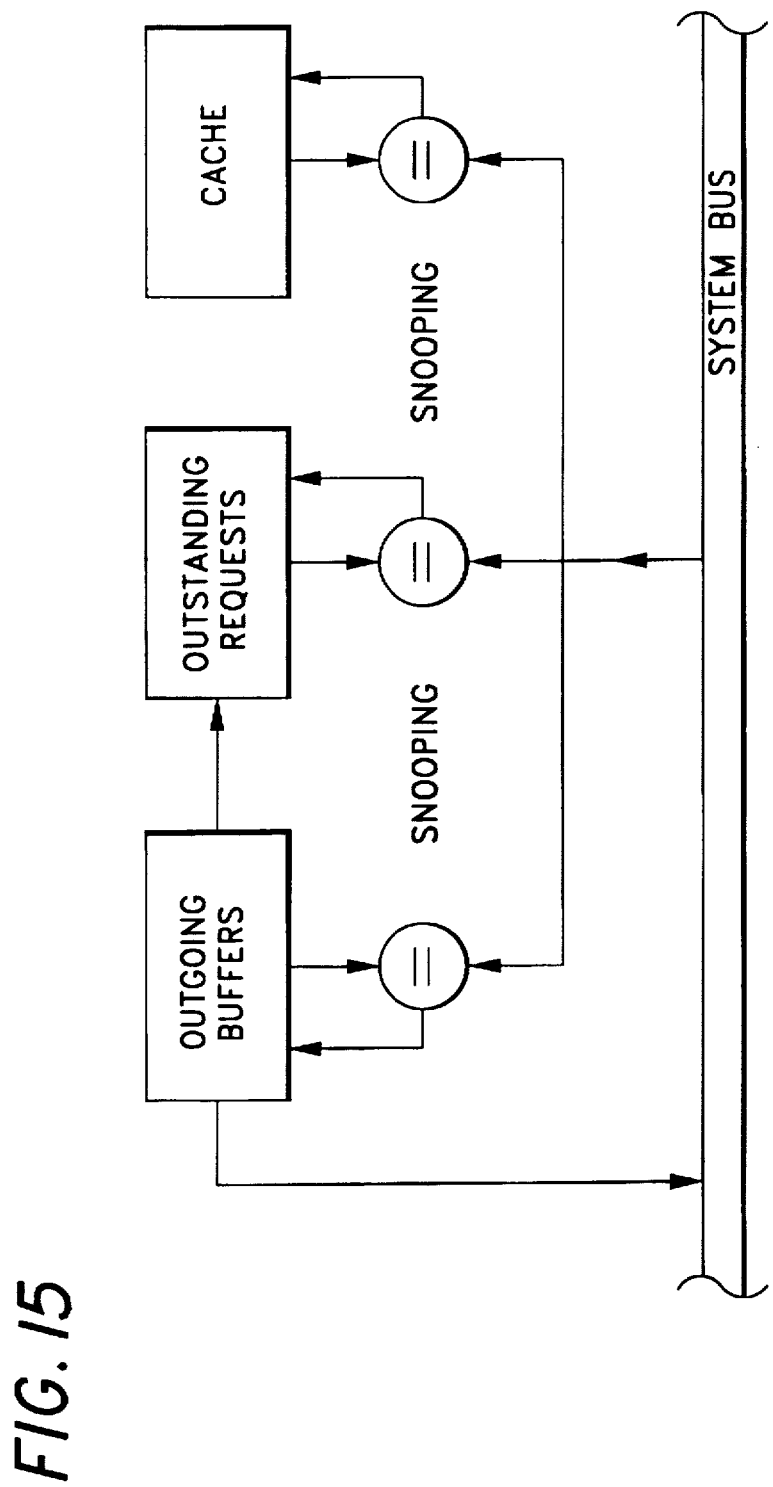
FIG. 15 is an illustrative block diagram of a buffering structure employed within one of the microprocessors of FIG. 1.

FIG. 15 shows the processor buffer structure used in one embodiment of the invention. Because of the arbitration and response times are of short duration most agents on the bus must maintain such processor buffer structure. It is contemplated that the actual implementation of the processor buffer structure may not be exactly as shown in FIG. 15, but the implementation reflects the spirit and function of the processor buffer structure. The outstanding request buffers contain requests that have gone out to the local bus but the transaction is not completed. All requests in the buffers need to be snooped to ensure proper line states. The outgoing buffers hold the requests that are about to go out on the system bus. If the address of the current bus transaction from another agent matches a request in the buffers, actions described below need to be taken so that conflicts can be resolved.

When the address of the current bus request matches that of one of the requests in the outgoing buffers, a conflict within the same bus cluster occurs. Because all processors involved reside on the same bus, an order of access must be established. More specifically, if the outgoing request is read or partial line write, no special action is required because the remote agent's request does not affect the local agent's read/write miss or partial write requests.

If the outgoing request is a line invalidate transaction without a read then, if the current bus request from another agent is an invalidate line, partial write request or write line, the outgoing line invalidate request needs to be converted into a read and invalidate line request because the current request from another agent invalidates the current line residing in the local cache. If the current bus request from another agent is read-line or read partial line, no special action is required since the remote agent's request does not cause a removal of the local cache line.

If the outgoing request is writeback line transaction and the current bus request is read-line, read-partial line, read invalidate line, invalidate line, write partial line, or BLR readline transaction, the writeback is converted into an Implicit Writeback and the outgoing request is then removed, or if the current bus request is a write-line transaction, then optimally, the implicit writeback data transfer is cancelled since the current bus request overwrites the whole line.

In addition to providing a pipelined bus that offers deferred transactions, as well a multiprocessor ready data coherency, the described bus system allows for processor ordering. Processor ordering is achieved by the technique of having each microprocessor postpone any requests for order dependent operations until the operations on which they are dependent upon are observed and have gone past the point where they can be canceled (i.e., the Snoop Phase). Dependent operations are operations that act on other data that needs to be calculated. This can be a problem in a pipelined system because a processor may request two sequential (i.e., back-to-back) instructions, and then have one canceled either by defer or retry, during a subsequent phase. This is a likely event since the microprocessors used in the preferred embodiment issue speculative instructions that have a significant likelihood of being canceled. To prevent another agent from issuing a subsequent transaction and then not being able to get the necessary data, back-to-back writes must wait until Snoop Phase has been reached and no DEFER# has been asserted. Therefore back-to-back writes can only be asserted every six clock cycles, as opposed to every three clock cycles for other transactions.

Thus, a method and apparatus for providing highly pipelined bus system that is multiprocessor ready, and that allows long latency transactions has been described. It will be apparent to one skilled in the art that various embodiments of the invention are possible other than the one disclosed. In general, the exemplary embodiment described herein is merely illustrative of the invention and should not be taken as limiting the scope. Therefore, the invention should be measured in terms of the claims which follow.

What is claimed is:

1. A method for transferring information through a computer system comprising the steps of:

interconnecting a plurality of agents via a bus pipelining a plurality of multi-phase bus transactions, said plurality of agents include at least one microprocessor having a cache;

maintaining coherency of said information by said at least one microprocessor performing a cache snoop during a snoop phase of each of said plurality of multi-phase bus transactions; and deferring at least one transaction of said plurality of multi-phase bus transactions without disrupting said pipelining of said bus by an agent of said plurality of agents asserting a control signal to postpone transfer of said information until said agent initiates a deferred reply transaction after gaining access to said information while continuing to request multi-phase bus transactions that are order independent of said at least one transaction.

2. A method for transferring information through a computer system comprising the steps of:

interconnecting a plurality of agents via a bus pipelining a plurality of multi-phase bus transactions, said plurality of agents include at least one microprocessor having a cache;

maintaining coherency of said information by said at least one microprocessor performing a cache snoop during a snoop phase of each of said plurality of multi-phase bus transactions and asserting a first and second control line of said bus generally concurrent to each other in order to temporarily stall said pipelining as needed; and deferring at least one transaction of said plurality of multi-phase bus transactions without disrupting said pipelining of said bus until a deferred reply transaction is initiated upon gaining access to said information or the at least one transaction is restarted.

3. The method according to claim 2, wherein said maintaining step further includes the step of performing an implicit Writeback transaction if said first control line is asserted.

4. The method according to claim 2 further comprising the step of ignoring said deferring of said at least one transaction if said first control line of said bus is asserted during said snoop phase.

5. The method according to claim 2, wherein said deferring step further comprising the steps of:

issuing a deferred signal by an agent during said snoop phase to indicate that said at least one transaction will be deferred; and storing a deferred identifier by said agent during a response phase, said deferred identifier is used as a request address for said deferred reply transaction.

6. The method according to claim 5, wherein said deferring step further comprising the step of:

issuing said deferred identifier stored by said agent after said agent can provide said information to begin said deferred reply transaction in order to complete said at least one transaction.

7. The method according to claim 2 further comprising the step of:

providing processor ordering of said plurality of multi-phase bus transactions by requiring said plurality of agents to postpone requesting a multi-phase bus transaction, dependent on one of said plurality of multi-phase bus transactions, until said at least one transaction of said plurality of multi-phase bus transactions cannot be either deferred or canceled.

8. The method according to claim 7, wherein said providing processor ordering step comprises the step of continuing requesting order independent transactions.

9. A method for transferring information through a computer system adapted with a bus to pipeline a plurality of multi-phase bus transactions and to interconnect a plurality of agents including a microprocessor having a cache, the method comprising the steps of:

deferring at least one transaction of a plurality of multi-phase bus transactions without a disruption of pipelining of said bus until an agent initiates a deferred reply transaction after gaining access to said information; and providing processor ordering of said plurality of multi-phase bus transactions by allowing one of the plurality of agents to (i) postpone requesting a multi-phase bus transaction, dependent on one of said plurality of multi-phase bus transactions, until said one of said plurality of multi-phase bus transactions cannot be either deferred or canceled and (ii) to continue requesting order independent transactions.

10. The method according to claim 9 further comprising the step of:

maintaining coherency of said information by said at least one microprocessor (i) performing a cache snoop during a snoop phase of each of said plurality of multi-phase bus transactions, and (ii) providing said information during a data phase immediately following its corresponding snoop phase if a first control line is asserted to indicate that said cache contains said information in a first predetermined state.

11. The method according to claim 10, wherein said first predetermined state includes a Modified state if said cache is operating in according with a MESI protocol.

12. The method according to claim 10, wherein said maintaining coherency step includes the step of stalling said pipelining if a second control line is asserted concurrently with said first control line.

13. The method according to claim 9 further comprising the step of ignoring said deferring of said at least one transaction if a first control line of said bus is asserted during said snoop phase.

14. A computer system comprising:

a plurality of agents including a memory element and at least one microprocessor including a cache; and a bus coupled to said plurality of agents, said bus supporting a plurality of multi-phase bus transactions transmitted in a pipeline scheme and includes a defer line activated by said at least one agent, the defer line to provide information for a transaction of said plurality of multi-phase bus transactions in order to defer at least said transaction without disrupting said pipeline scheme, and a plurality of control lines to extend the snoop phase for at least one more bus cycle when asserted during a snoop cycle.

15. The computer system of claim 14, wherein the plurality of control signals are asserted simultaneously during the snoop cycle.

16. A method comprising the step of:

providing a computer system including a bus to pipeline a plurality of multi-phase bus transactions;

maintaining coherency of information throughout the computer system by performing a cache snoop during a snoop phase of each of the plurality of multi-phase bus transactions; and deferring at least one multi-phase bus transaction without disrupting the pipelining of the plurality of multi-phase bus transactions until (i) a deferred reply transaction is initiated, or (ii) the at least one multi-phase bus transaction is initiated.

\* \* \* \* \*